United States Patent
Liu et al.

(10) Patent No.: US 10,053,523 B2
(45) Date of Patent: Aug. 21, 2018

(54) SUPPORTED POLYMETAL OLEFIN POLYMERIZATION CATALYST, PREPARATION METHOD AND USE THEREOF

(71) Applicant: East China University Of Science And Technology, Shanghai (CN)

(72) Inventors: Boping Liu, Shanghai (CN); Jingwen Wang, Shanghai (CN); Ruihua Cheng, Shanghai (CN); Xuelian He, Shanghai (CN); Zhen Liu, Shanghai (CN); Ning Zhao, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 0 days.

(21) Appl. No.: 15/535,902

(22) PCT Filed: Nov. 25, 2015

(86) PCT No.: PCT/CN2015/095514
§ 371 (c)(1),
(2) Date: Jun. 14, 2017

(87) PCT Pub. No.: WO2016/095678
PCT Pub. Date: Jun. 23, 2016

(65) Prior Publication Data
US 2017/0349677 A1    Dec. 7, 2017

(30) Foreign Application Priority Data
Dec. 16, 2014 (CN) .......................... 2014 1 0784344

(51) Int. Cl.
*C08F 10/02* (2006.01)
(52) U.S. Cl.
CPC .................. *C08F 10/02* (2013.01)

(58) Field of Classification Search
None
See application file for complete search history.

(56) References Cited

U.S. PATENT DOCUMENTS

| 4,303,771 A | 12/1981 | Wagner et al. |
| 6,221,803 B1 | 4/2001 | Vereecke |
| (Continued) | | |

FOREIGN PATENT DOCUMENTS

| CN | 1055184 A | 10/1991 |
| CN | 1625440 A | 6/2005 |
| (Continued) | | |

*Primary Examiner* — Catherine S Branch
(74) *Attorney, Agent, or Firm* — Boyle Fredrickson, S.C.

(57) ABSTRACT

The present invention relates to a supported polymetal olefin polymerization catalyst, comprising a porous support, a magnesium-containing support component, a transition metal titanium component supported on the porous support, and further comprising at least one non-magnesium metal component supported on the porous support. Further provided is a preparation method and a use of the supported polymetal olefin polymerization catalyst. An efficient composite support supported polymetal Ziegler-Natta catalyst is provided in the present invention, wherein a porous support, a soluble magnesium compound, and a soluble non-magnesium metal compound are used as raw materials. The supporting of titanium is achieved while a composite support containing magnesium and non-magnesium metal components is formed in situ in the surface of the porous support. The present invention has the advantage of a simple preparation method, a low cost, a controllability of morphology, properties of the catalyst, etc. Comparing the provided catalyst with the same type of magnesium/titanium catalyst free of non-magnesium metal components, the catalytic performance such as polymerization activity, hydrogen regulation sensitivity and copolymerization performance are significantly improved.

12 Claims, 1 Drawing Sheet

(56) References Cited

U.S. PATENT DOCUMENTS

| | | |
|---|---|---|
| 6,825,146 B2 | 11/2004 | Kilty |
| 6,930,071 B2 | 8/2005 | Knoeppel |
| 7,078,362 B2 | 7/2006 | Nagy |
| 7,348,383 B2 | 3/2008 | Zoeckler |

FOREIGN PATENT DOCUMENTS

| | | | |
|---|---|---|---|
| CN | 1691979 A | 11/2005 | |
| CN | 1923863 A | 3/2007 | |
| CN | 101274968 A | 10/2008 | |
| CN | 103772538 A | 5/2014 | |
| CN | 103772539 A | 5/2014 | |
| CN | 103965387 A | 8/2014 | |
| CN | 104072646 A | 10/2014 | |
| CN | 104448066 A | 3/2015 | |
| WO | 2013/156491 | 10/2013 | |
| WO | WO-2013156491 A1 * | 10/2013 | ............ C08F 210/16 |

* cited by examiner

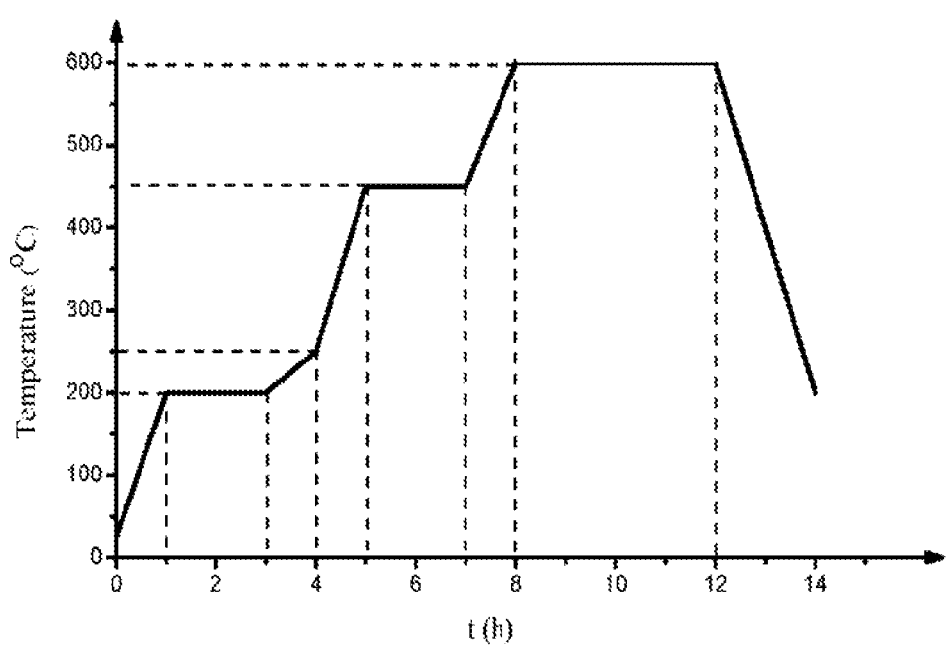

SUPPORTED POLYMETAL OLEFIN POLYMERIZATION CATALYST, PREPARATION METHOD AND USE THEREOF

CROSS-REFERENCE TO RELATED APPLICATIONS

This application is a Section 371 U.S. National Phase Entry of International Patent Application No. PCT/CN2015/095514, international filing date Nov. 25, 2015, which claims priority to Chinese Patent Application No. 201410784344.6, filed Dec. 16, 2014, the contents of which are incorporated by reference in their entireties.

TECHNICAL FIELD

The present invention relates to a supported olefin polymerization catalyst, and even moreso relates to a preparation method and a use of the supported polymetal olefin polymerization catalyst.

RELATED ART

Polyethylene (PE) and polypropylene (PP) are parts of the five general synthetic resins, and are the most widely used synthetic resins. Polyethylene owns the largest production among the general synthetic resins, which exhibits chemical resistance, good mechanical strength, electrical insulation, low cost characteristics, etc. Polypropylene shows excellent thermoplastic properties, and has the advantages of non-toxic, chemical stability, and easy processing, which is the best heat-resistant product in the general resins. Therefore, polyethylene and polypropylene are widely used in people's daily life, industry, agriculture, packaging, and other aspects with a pivotal position. Polyolefin products with excellent performances are closely related to catalysts used in polymerization.

Ziegler-Natta catalyst originated from the great discoveries of the $TiCl_4$-$AlEt_3$ and $TiCl_3$-$AlEt_2Cl$ catalytic systems by Ziegler and Natta in the early 1950s, respectively. This kind of Ziegler-Natta catalyst was successfully used in low temperature and pressure to synthesize high-density polyethylene and polypropylene with higher isotacticity. Modifications and further studies were proceeded based on this kind of Ziegler-Natta catalyst, including U.S. Pat. No. 6,221,803, U.S. Pat. No. 6,825,146, U.S. Pat. No. 6,930,071, U.S. Pat. No. 7,078,362, U.S. Pat. No. 7,348,383, etc.

Because the initial Ziegler-Natta catalyst presented a low activity and a low utilization of a titanium atom, a residue removal process was necessary for the original polyolefin process to remove ash in the catalyst, which resulted in high production costs. Therefore, researchers began to explore methods for preparing supported catalysts. In the late of 1960s, Kashiwa from Mitsui Chemicals in Japan (Patent JP 1031698) and Galli from Italian company Montecatini (Patent GB 1286867A) developed a Ziegler-Natta catalyst with high activity, in which titanium chloride was supported on $MgCl_2$. The discovery of the $MgCl_2$ carrier (support) is a milestone in the polyolefin industry and leads to innovative improvement of the polyolefin properties. Due to the significant increase of the catalytic activity, the elimination of the de-ashing process, and the industrialization, the application of the polyolefin products was promoted greatly. $MgCl_2$ supported high efficiency Ziegler-Natta catalyst and still has been a major industrial catalyst in polyolefin production after years of sustained development. There are mainly two ways to prepare the $MgCl_2$ carrier (support): 1) The first type is called the two-step process, reported by Kashiwa and Galli, in which anhydrous $MgCl_2$ is used as a Mg-source, and reacts with alcohol to form $MgCl_2$-alcoholate adduct. Then, an excess amount of $TiCl_4$ removes the alcohol and make the Ti species (transition metal active component containing titanium) supported on the $MgCl_2$ support. This kind of method is relatively complex and shows a high production cost. 2) The second type is called the one-step process developed by Hoechst Company (THB polyethylene catalyst) and Toho titanium Company (THC polypropylene catalyst, U.S. Pat. No. 4,547,476 A), in which the $MgCl_2$ support is directly synthesized in situ by the reaction between $Mg(OEt)_2$ and $TiCl_4$, and the Ti species is supported thereon simultaneously. The preparation process is simple, however, due to the fact $Mg(OEt)_2$ raw materials are expensive, the cost of the preparation process is high, and the morphology control of the catalyst particle is difficult.

Another major industrial supported Ziegler-Natta catalyst is $MgCl_2$/$SiO_2$, abi-supported catalyst. Firstly, amorphous porous silica is an excellent carrier material for polyolefin catalysts. Chien et al has found that a carrier having functional groups (mainly hydroxyl groups) supported with the transition metal compound may synthesize olefin polymerization catalyst with high activity. Secondly, $SiO_2$ has a porous structure and a high specific surface area, and contains a small amount of reactive groups, such as silanol groups, etc., which may be reacted with $TiCl_4$ in the catalyst to obtain the $SiO_2$ supported Ziegler-Natta catalyst. U.S. Pat. No. 4,293,673, U.S. Pat. No. 4,302,565, U.S. Pat. No. 4,302,566 and U.S. Pat. No. 4,303,771 reported that the Union Carbide Company developed high efficiency Ziegler-Natta catalysts based on silica and magnesium dichloride composite support, and the representative of the industrial catalyst is the M-1 catalyst which has been applied in UNIPOL gas phase process. The catalyst is prepared as follows: anhydrous $MgCl_2$, as the Mg-source, is dissolved in THF to form a homogeneous solution followed by impregnation with the thermally-treated $SiO_2$ to form a composite carrier. Then, the titanium species is supported on the surface of the composite carrier, and the THF coordinated with the magnesium chloride needs to be removed using the alkylaluminum or halogenated alkylaluminium. This catalyst shows high catalytic activity, good hydrogen response, and good copolymerization ability; however, the production method is complex and the cost thereof is high.

Recently, we have proposed a novel composite carrier supported Ziegler-Natta catalyst using any porous carrier and any low-costsoluble magnesium-containing compound as raw materials, which is different from the conventional catalyst described above in the patent CN103351443A. The catalyst is prepared through impregnation of solution of soluble Mg-compounds on the porous carrier. This forms a supported thin layer of magnesium compound on the surface of the porous carrier by high temperature calcination, followed by further reaction with chlorinated titanium compound or solution. This process is to synthesize the support containing magnesium compound in situ and to support the titanium species on the surface of the poroussupport simultaneously. This catalyst preparation method is simple and low-cost without using water-oxygen sensitive compounds such as anhydrous magnesium chloride or ethoxymagnesium, and the resulting catalyst shows an excellent performance in olefin polymerization. However, considering the industrial application, the catalytic activity, the hydrogen sensitivity, and the copolymerization performance of this catalyst, it needs to be further improved.

SUMMARY OF THE INVENTION

In order to solve the problems mentioned above, the present invention aims to provide a supported polymetal olefin polymerization catalyst with improved polymerization activity, hydrogen regulation sensitivity, and copolymerization performance, and to provide preparation methods and uses thereof.

The present invention relates to a supported polymetal olefin polymerization catalyst, comprising a porous support, a magnesium-containing support component, and a transition metal titanium component supported on the porous support. It further comprises at least one non-magnesium metal component supported on the porous support.

According to the supported polymetal olefin polymerization catalyst of the present invention, porous support is one or more selected from silica, alumina, aluminosilicate ($xAl_2O_3 \cdot ySiO_2$), titania, zirconia, magnesium oxide, calcium oxide, inorganic clays, etc. or combinations thereof. The inorganic clays may include, e.g. montmorillonite and the like. According to one embodiment of the present invention, inorganic support is selected from silica gel, such as amorphous porous silica gel. These supports are commercially available or may be synthesized by known processes. For example, Davison 955 may be used as a silica gel. According to the supported polymetal olefin polymerization catalyst of the present invention, the specific surface area of porous support is usually 10~800 m²/g, preferably 100~300 m²/g; the pore volume of porous support is 0.1~6.0 cm³/g, preferably 0.5~3.0 cm³/g; and the average pore size of porous support is 1~50 nm, preferably 5~40 nm. Porous support used in the present invention may be any support generally used in the preparation of olefin polymerization catalyst.

According to the supported polymetal olefin polymerization catalyst of the present invention, the magnesium-containing support component is a kind of magnesium compound and is one or more of the general formula $MgO_v(L^1)_jCl_m$ and combinations thereof, wherein $L^1$ is $C_1$-$C_{20}$ alkyl group $R^1$ or alkoxy group $R^1O$, wherein $R^1$ may be a saturated or unsaturated straight-chain, branched, or cyclic chain (including aromatic hydrocarbons), $0 \leq v \leq 1$, $0 \leq m \leq 2$, $0 \leq j \leq 2$, when j=2, and wherein $L^1$ may be same or different.

According to the supported polymetal olefin polymerization catalyst of the present invention, the non-magnesium metal component is a metal component other than magnesium and is one or more of main group metals, transition metals, etc., such as vanadium, chromium, titanium, magnisium, ferrum, cobalt, nickel, copper, zinc, molybdenum, wolframium, zirconium, aluminum, lithium, sodium, potassium, calcium, etc., and combinations thereof. The general formula is $M_dO_fCl_r(L^2)_e$, wherein $L^2$ is $C_1$-$C_{20}$ alkyl group $R^2$ or alkoxy group $R^2O$, wherein $R^2$ may be a saturated or unsaturated straight-chain, branched, or cyclic chain (including aromatic hydrocarbons), $1 \leq d \leq 2$, $0 \leq f \leq 5$, $0 \leq r \leq 5$, $0 \leq e \leq 5$, when e is 2 or more than 2, and wherein $R^2$ may be same or different.

According to the supported polymetal olefin polymerization catalyst of the present invention, the transition metal titanium component is a titanium-containing compound and is one or more of the general formula $Ti(L^3)_nCl_{4-n}$, or $Ti(L^3)_gCl_{3-g}$, or $Ti(L^3)_kCl_{2-k}$, wherein $L^3$ is $C_1$-$C_{20}$ alkyl group $R^3$ or alkoxy group $R^3O$, wherein $R^3$ may be a saturated or unsaturated straight-chain, branched, or cyclic chain (including aromatic hydrocarbons), $1 \leq n \leq 4$, $0 \leq g \leq 3$, $0 \leq k \leq 2$, when n, g and k is 2 or more than 2, and wherein $R^3$ may be same or different.

According to the supported polymetal olefin polymerization catalyst of the present invention, the weight of magnesium of the magnesium-containing support component is 0.5 wt %~20 wt % based on the whole weight of the supported catalyst.

According to the supported polymetal olefin polymerization catalyst of the present invention, the molar ratio of the titanium in transition metal titanium component and the magnesium described above is 0.01:1~10:1.

According to the supported polymetal olefin polymerization catalyst of the present invention, the molar ratio of the magnesium described above and non-magnesium metal compound is 0.1:1~30:1.

This present invention also provides a preparation method of the supported polymetal olefin polymerization catalyst, which comprises the following steps: S1, porous support is impregnated with a mixed solution of soluble magnesium compound and non-magnesium metal compound, followed by calcination at high temperature of 300~900° C.; and S2, the product obtained from S1 further reacts with titanium-containing compound or solution thereof to obtain the catalyst.

Step S1, described above, further comprises the surface modification of the calcined product after the calcination reaction at high temperature, as described above, using one or two organic magnesium compounds and organic aluminum compounds to remove the surface residual hydroxyl group.

According to the preparation method for the supported polymetal olefin polymerization catalyst of the present invention, the general formula of organic magnesium compound is $R^5_pMgX_{2-p}$, wherein $R^5$ is $C_1$-$C_{20}$ alkyl group, wherein $R^5$ may be a saturated or unsaturated straight-chain, branched, or cyclic chain (including aromatic hydrocarbons), $0 \leq p \leq 2$, when p is 2, and $R^5$ may be the same or different. X is a halogen, one or more selected from fluorine, chlorine, bromine and iodine.

According to the preparation method for the supported polymetal olefin polymerization catalyst of the present invention, the molar ratio of organic magnesium compound and the magnesium supported on the porous support is 0~100.

According to the preparation method for the supported polymetal olefin polymerization catalyst of the present invention, the organic magnesium compound is one or more selected from methyl magnesium chloride, ethyl magnesium chloride, butyl magnesium chloride, allyl magnesium chloride, isopropyl magnesium chloride, t-butyl magnesium chloride, 2-methyl butyl magnesium chloride, 1-heptyl magnesium chloride, 1-pentyl magnesium chloride, 1-hexyl magnesium chloride, 1,1-dimethylpropyl magnesium chloride, cyclopentyl magnesium chloride, vinyl magnesium chloride, 2-butyl magnesium chloride, 1-octyl magnesium chloride, etc., and combinations thereof.

According to the preparation method for the supported polymetal olefin polymerization catalyst of the present invention, organic aluminum compound is one or more selected from trialkylaluminum $AlR_3$, dialkyl alkoxide aluminum $AlR_2OR$, dialkyl aluminum halides $AlR_2X$, aluminoxane, triethyldialuminium trichloride, etc., and combinations thereof, wherein R is a $C_1$-$C_{12}$ alkyl group, and X is a halogen, wherein X is one or more selected from fluorine, chlorine, bromine and iodine.

According to the preparation method for the supported polymetal olefin polymerization catalyst of the present invention, the molar ratio of organic aluminum compound and the magnesium supported on the porous support is 0~100.

According to the preparation method for the supported polymetal olefin polymerization catalyst of the present invention, soluble magnesium compound is any soluble magnesium-containing compound and is one or more selected from: magnesium carbonate, magnesium bicarbonate, magnesium chromate, magnesium silicofluoride, magnesium acetate, magnesium nitrate, magnesium fluoride, magnesium chloride, magnesium bromide, magnesium iodide, magnesium sulfate, magnesium gluconate, magnesium chlorate, perchloric acid magnesium, magnesium phosphate, magnesium sulfide, magnesium citrate, magnesium amide, etc., and combinations thereof.

According to the preparation method for the supported polymetal olefin polymerization catalyst of the present invention, the soluble magnesium compound is magnesium nitrate, magnesium acetate, magnesium bicarbonate, magnesium chromate, magnesium fluoride, magnesium sulfate, magnesium sulfide, magnesium chlorate, or magnesium phosphate.

According to the preparation method for the supported polymetal olefin polymerization catalyst of the present invention, the non-magnesium metal compound is one or more selected from: metal nitrates, phosphate, sulphate, acetate, metal oxide, chloride, chlorinated oxide, etc., such as soluble vanadium compound, ammonium hexafluorovanadate, vanadium nitrate, vanadium oxyoxalate, ammonium metavanadate, vanadyl sulfate, vanadium(IV) sulfate oxide hydrate, vanadyl(III) sulfate, vanadium trichloride, sodium orthovanadate, sodium metavanadate, vanadylacetonate vanadium oxide, isopropyl orthovanadate, vanadyl-tris-n-propoxide, vanadyl acetylacetonate, vanadium oxytriethoxide, vanadyl chloride, vanadium silicide, etc., and combinations thereof. Soluble chromium compound is one or more selected from: chromic nitrate, chromium chloride, chromic sulfate, diammonium chromate, ammonium bichromate, chromic acetate, etc., and combinations thereof. Soluble molybdenum compound is one or more selected from: molybdenum phosphate, molybdenum acetate, molybdenum sulfate, silicomolybdic acid, ammonium molybdate, molybdenum nitride, etc., and combinations thereof. Soluble wolframium compound is one or more selected from: wolframium nitrate, phosphotungstic acid, wolframium sulfate, wolframium carbonate, wolframium acetate, etc., and combinations thereof. Soluble aluminum compound is one or more selected from: aluminum nitrate, aluminum sulfate, aluminum oxalate, aluminum borate, etc., and combinations thereof. Soluble zirconium compound is one or more selected from: zirconium nitrate, zirconium carbonate, zirconium oxysulfate, basic zirconium sulfate, etc., and combinations thereof. Soluble zinc compound is one or more selected from: zinc nitrate, zinc oxalate, zinc thiolacetic, zinc acetate, zinc carbonate hydroxide, etc., and combinations thereof. Soluble copper compound is one or more selected from: copper sulfate, copper carbonate, cupric nitrate, copper phosphate, etc., and combinations thereof. Soluble ferrum compound is one or more selected from: ferric acetate, ferric nitrate, ferric oxalate, ferric gluconate, etc., and combinations thereof. The nickel compound is one or more selected from: nickel nitrate, nickel sulfate, nickel carbonate, chromic acetate, etc., and combinations thereof.

According to the preparation method for the supported polymetal olefin polymerization catalyst of the present invention, the non-magnesium metal compound is one or more selected from: vanadium nitrate, ammonium metavanadate, aluminum nitrate, zirconium nitrate, zinc nitrate, cupric nitrate, ferric nitrate, molybdenum acetate, molybdenum sulfate, vanadium nitrate, molybdenum nitrid, vanadium sulfate oxide hydrate, wolframium nitrate, wolframium carbonate, wolframium acetate, nickel nitrate, or nickel carbonate basic hydrate.

According to the preparation method for the supported polymetal olefin polymerization catalyst of the present invention, titanium-containing compound which reacts with the calcination product from Step S1, as described above, is one or more compound of $Ti(L^4)_hCl_{4-h}$, or $Ti(L^4)_sCl_{3-s}$, or $Ti(L^4)_tCl_{2-t}$, wherein $L^4$ is $C_1$-$C_{20}$ alkyl group $R^4$ or alkyl oxide group $R^4O$, wherein $R^4$ may be a saturated or unsaturated straight-chain, branched, or cyclic chain (including aromatic hydrocarbons), $0 \leq h \leq 4$, $0 \leq s \leq 3$, $0 \leq t \leq 2$, when h, s and t is 2 or more than 2, and $R^4$ may be same or different.

According to the preparation method for the supported polymetal olefin polymerization catalyst of the present invention, titanium-containing compound is one or more selected from: trimethoxy titanium chloride, triethoxy titanium chloride, tri-n-propoxy titanium chloride, tri-isopropoxy titanium chloride, dimethoxy titanium dichloride, diethoxy titanium dichloride, di-isopropoxy titanium dichloride, methoxy titanium trichloride, ethoxy titanium trichloride, titanium tetrachloride, titanium trichloride, titanium dichloride, ethyl titanium chloride, etc., and combinations thereof.

According to the preparation method for the supported polymetal olefin polymerization catalyst of the present invention, the titanium-containing compound is $TiCl_4$, triethoxy titanium chloride, diethoxy titanium dichloride, methoxy titanium trichloride, or titanium trichloride.

According to the preparation method for the supported polymetal olefin polymerization catalyst of the present invention, an internal electron donor can also be added, which is one or more selected from the compounds in the below figures (I), (II), (II), (IV) and any other alkyl ester of saturated aliphatic carboxylic acid, alkyl esters of aromatic carboxylic acid, aliphatic ethers, cyclic ethers, saturated aliphatic ketones, glycol esters, etc., and combinations thereof. Generally, an internal electron donor is well known in the field of olefin polymerization:

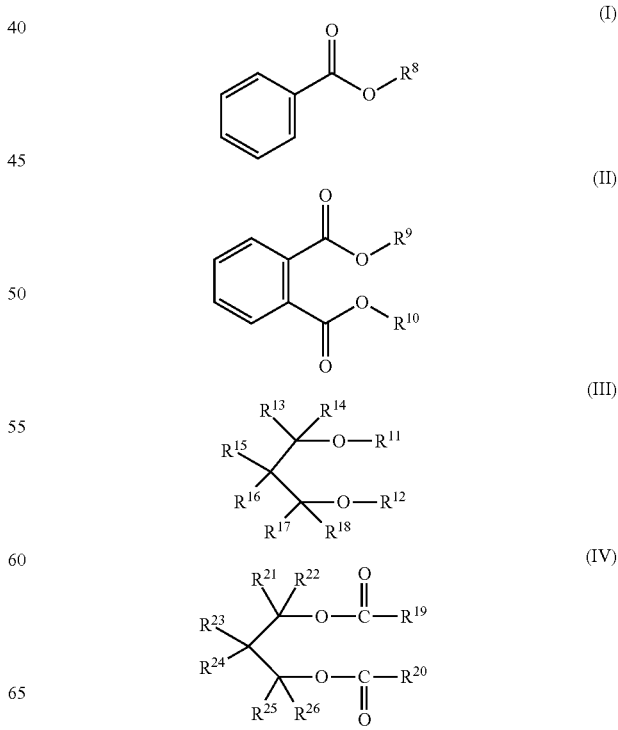

Wherein, $R^8$-$R^{26}$ are the same or different hydrogen atoms or C1-$C^{20}$ alkyl group, which may be saturated or unsaturated straight-chain, branched, or cyclic chain (including aromatic hydrocarbons). The internal electron donor is one or more selected from: methyl methacrylate, ethyl methacrylate, butyl methacrylate, methyl formate, ethyl formate, butyl formate, methyl acetate, ethyl acetate, butyl acetate, methyl paraben, ethylparaben, butylparaben, amino methyl benzoate, amino ethyl benzoate, butyl aminobenzoate, p-methyl benzenesulfonate, p-ethyl benzenesulfonate, p-butyl benzenesulfonate, methyl benzoate, ethyl benzoate, butyl benzoate, methyl salicylate, ethyl salicylate, butyl salicylate, p-benzene diacetic diether, dimethyl isophthalate, diethyl isophthalate, dibutyl isophthalate, dimethyl phthalate, diethyl phthalate, phthalic acid di-n-propyl ester, dibutyl phthalate, diisobutyl phthalate, orthophthalic dibutene dibutyl ester, diisooctyl phthalate, dimethyl oxalate, diethyl oxalate, dibutyl oxalate, 2,2-diethyl malonate n-butyl acetate, 2,3-dimethyl methyl succinic acid, β-methyl glutaric acid diisopropyl ester, phthalic acid-1,3-diamyl ester, diethyl ether, hexyl ether, 2,2-di-iso-butyl-1,3-methoxypropane, tetrahydrofuran (THF), acetone, methyl isobutyl ketone, 2-ethyl-1,3-propanediol dibenzoate, 2-isopropyl-2-isopentyl-1,3-propanediol dibenzoate, 1,3-butanediol dimethyl benzoate, 1,3-pentanediol neopentyl ester, 2,4-pentanediol dibenzoate, 2-methyl-1,3-pentanediol benzoate cinnamate, 2,4-heptandiol dibenzoate, 2-methyl-3,5-heptandiol dibenzoate, 9,9-bis (methoxymethyl) fluorine, etc., and combinations thereof. The molar ratio of internal electron donor and the magnesium loading on the porous support is 0~500, preferably 0~50.

According to the preparation method for the supported polymetal olefin polymerization catalyst of the present invention, one embodiment of the present invention comprises of the steps:

a) Porous support is impregnated with a mix solution of soluble magnesium compound and soluble non-magnesium metal compound, then is dried and calcined at high temperature of 300~900° C.;

b) The product obtained from step (a) reacts with titanium-containing compound or solution thereof, if necessary, and the internal electron donor may be added into the reaction system simultaneously, followed by washing and drying to prepare the catalyst.

A preferred process for the preparation method of the supported polymetal polyolefin catalyst of the present invention comprises the steps of:

a) Porous support is impregnated with a mixed solution of soluble magnesium compound and soluble non-magnesium metal compound at 0~80° C. for 0.5~12 h, preferably room temperature~70° C. and 4~8 h, followed by drying at room temperature~250° C. for 2~20 h, preferably 80~200° C. and 8~15 h, and the drying process may be also carried out under vacuum. Subsequently the product is calcined and activated in an inert gas or oxygen or air at high temperature of 300~900° C. for 1~10 h, preferably 400~800° C. and 3~8 h. Then by cooling, air is replaced with the inert gas such as nitrogen or argon and the like when it is cooled down to 300~400° C.

b) The product obtained from step (a) reacts with titanium-containing compound or solution thereof at room temperature~200° C. for 0.5~8 h, preferably 80~180° C. and 1~5 h. If necessary, the internal electron donor may be added into the reaction system simultaneously, then the product is washed by a $C_3$-$C_{20}$ alkane solvent, such as n-heptane or hexane and the like, at 0~150° C., preferably room temperature~100° C. The product is dried at room temperature~250° C. for 2~20 h, preferably 80~160° C. and 6~12 h, and then the catalyst is prepared and stored.

Generally, according to the present invention, the porous support is impregnated with soluble magnesium compound and soluble non-magnesium metal compound. A catalyst matrix supported magnesium and non-magnesium metal compound is prepared after high temperature calcination, then the catalyst matrix further reacts with titanium-containing compound or solution thereof to synthesize the support containing magnesium and non-magnesium metal compound in situ and to support the titanium species A on the surface of the porous support simultaneously. If necessary, the internal electron donor may be added into the reaction system to prepare the supported polymetal olefin polymerization catalyst.

Said step (a) relates to a method of depositing the soluble magnesium compound and the soluble non-magnesium metal compound onto the porous support (for example the support described above), and such method may be any method capable of depositing magnesium compound and non-magnesium metal compound onto the support, which is well known. In one embodiment of the present invention, the method of depositing magnesium compound and non-magnesium metal compound onto the support comprises impregnating the porous support with a mixed solution of magnesium compound and non-magnesium metal compound, wherein the magnesium compound and non-magnesium metal compound may be any soluble magnesium compound and soluble non-magnesium metal compound, as describe before. In one embodiment, a stirring, preferably a continuous stirring, may be carried out during the impregnation process. Generally, such stirring lasts from about 1~12 h at 0~80° C., preferably 4~8 h and at room temperature~70° C. In one embodiment, the loading of magnesium is 0.5 wt %~20 wt % based on the total weight of the catalyst, the molar ratio of magnesium compound and non-magnesium metal compound is 0.1:1~30:1. Then, the resultant magnesium and non-magnesium metal-supporting support is dried, generally at room temperature~250° C., preferably 80~200° C. In one embodiment, the drying is conducted at about 120° C., and the drying process may also be carried out under vacuum. The duration period of such drying is not specially limited, but such drying generally lasts from about 2~20 h, preferably 7~18 h, further preferably 8~15 h. After drying, the magnesium and non-magnesium metal-supporting porous support is calcined. The calcining manner is not specifically limited, but is preferably conducted within a fluidized bed. In one embodiment, such calcining is carried out by two stages—a low temperature stage and high temperature stage. The low temperature stage is generally conducted at about 100~300° C., and the high temperature stage is generally conducted at about 300~900° C. Without any theoretical limitation, it is believed that the physical water of the support is removed during the low temperature stage, and soluble magnesium compound and soluble non-magnesium metal compound partially decompose. The hydroxyl radical on the porous support is partially removed during the high temperature stage, and soluble magnesium compound and soluble non-magnesium metal compound completely decompose. In one embodiment, the low temperature stage lasts from 1~10 h, preferably 2~9 h, further preferably 3~8 h. In another embodiment, the high temperature stage lasts from 1~10 h, preferably 2~9 h, further preferably 3~8 h. In one embodiment, the low temperature stage is carried out under an inert atmosphere or air, preferably an inert atmosphere, wherein the inert gas is selected from nitrogen, helium, argon, etc., preferably nitrogen, such as high purity nitrogen. In one embodiment, the calcination is carried out in air or oxygen, preferably dry air. After calcination, the resultant support supporting magnesium and non-magnesium metal-containing compound is cooled from the high temperature stage. In one embodiment, when the temperature is decreased to 300~400° C., the atmosphere may be changed, e.g. from air to inert gas, such as nitrogen, argon, etc. In one embodiment, such cooling is a natural falling of temperature.

Said step (b) relates to a method of supporting titanium-containing compound onto porous support and the preparation method of the catalyst. In one embodiment, the product obtained from step (a) reacts with titanium-containing compound or solution thereof, a stirring, preferably a continuous stirring, may be carried out during the reaction. Generally, such stirring lasts from about 0.5~8 h, preferably 1~5 h. The molar ratio of titanium-containing compound and the magnesium loading supported on the porous support is 0.01~500, preferably 0.1~200. Generally, this period is carried out at room temperature~200° C., preferably 80~180° C. If necessary, the internal electron donor may be added into the reaction system simultaneously. The internal electron donor is selected from the donors described before, and the molar ratio of the internal electron donor and the magnesium loading on the porous support is 0.01~500, preferably 0.1~50. $C_3$-$C_{20}$ alkane is used as a washing solvent, such as n-heptane, hexane, etc. at 0~150° C., preferably room temperature~100° C. The product is dried at room temperature~250° C. for 2~20 h, preferably 80~160° C. and 6~12 h, and the drying process is also carried out under vacuum. The obtained catalyst is then transferred under nitrogen and stored.

As an example, a detailed operation for preparing the catalyst of the present invention includes:

A porous amorphous silica gel is impregnated with a solution of magnesium acetate and ammonium metavanadate of a certain concentration, wherein the loading of magnesium based on the total weight of the catalyst (e.g. 0.5 wt %~20 wt %) satisfies the requirement in the present application. The molar ratio of magnesium and vanadium supported on the catalyst is 0.1:1~30:1. After being continuously stirred for a certain period of time (e.g. 4~8 h), it then is heated and dried. The silica gel support supporting magnesium acetate and ammonium metavanadate is calcined under high-temperature in a fluidized bed, wherein at the low temperature stage (e.g. 100~300° C.), the physical water of the support is removed under nitrogen and the magnesium acetate and ammonium metavanadate partially decompose. At the high temperature stage (e.g. 300~900° C.), the hydroxyl group on the surface of the silica gel is removed under dry air, and the magnesium acetate and ammonium metavanadate completely decompose. The high temperature stage lasts a certain period of time (e.g. 3~8 h). The product is naturally cooled down, and when the temperature is decreased to 300~400° C., the atmosphere may be changed to nitrogen. Then, at a certain temperature (e.g. 80~180° C.), the catalyst matrix obtained reacts with $TiCl_4$, and the molar ratio of $TiCl_4$ and the magnesium loading on the porous support is 0.1~200. If necessary, the internal electron donor may be added into the reaction system, such as dibutyl-phthalate, and the molar ratio of internal electron donor and the magnesium loading on the porous support is 0.1~50. After being continuously stirred (e.g. 1~5 h), the product is washed with hexane at a certain temperature (e.g. room temperature~100° C.) and is dried at 80~160° C. for 6~12 h under inert gas, such as nitrogen, helium, argon, etc., preferably nitrogen, and this drying process is also carried out under vacuum. The catalyst is then transferred under the protection of nitrogen and stored.

One embodiment of the present invention which provides the supported polymetal polyolefin catalyst comprises the steps of:

a) Porous support is impregnated with a mixed solution of soluble magnesium compound and soluble non-magnesium metal compound, then is dried and calcined at high temperature of 300~900° C.;

b) The product obtained from step (a) reacts with organic magnesium compound, and is then dried;

c) The product obtained from step (b) reacts with titanium-containing compound or solution thereof, and, if necessary, the internal electron donor may be added into the reaction system simultaneously, followed by washing and drying, to prepare the catalyst.

A preferred process for preparing a supported polymetal polyolefin catalyst of the present invention comprises the steps of:

a) Porous support is impregnated with a mixed solution of soluble magnesium compound and soluble non-magnesium metal compound at 0~80° C. for 0.5~12 h, preferably room temperature~70° C. and 4~8 h, then is dried at room temperature~250° C. for 2~20 h, preferably 80~200° C. and 8~15 h. The drying process may also be carried out under vacuum. Subsequently the product is then calcined and activated in inert gas or oxygen or air at high temperature of 300~900° C. for 1~10 h, preferably 400~800° C. and 3~8 h, and then is cooled down, wherein air is replaced with an inert gas such as nitrogen or argon and the like when it is cooled to 300~400° C.

b) The product obtained from step (a) reacts with organic magnesium compound at 0~150° C. for 5 min~2 h, preferably room temperature~70° C. for 10 min~1 h. The product is washed by $C_3$-$C_{20}$ alkane solvent such as n-heptane, hexane, etc. at 0~150° C., preferably room temperature~100° C. The product is dried at room temperature~250° C. for 2~20 h, preferably 60~120° C. and 6~12 h, and the drying process may also be carried out under vacuum. Then the product is obtained and stored.

c) The product obtained from step (b) reacts with the titanium-containing compound or solution thereof at room temperature~200° C. for 0.5~8 h, preferably 80~180° C. for 1~5 h. If necessary, the internal electron donor may be added into the reaction system simultaneously, then the product is washed by $C_3$-$C_{20}$ alkane solvent such as n-heptane, hexane, etc. at 0~150° C., preferably room temperature~100° C. The product is dried at room temperature~250° C. for 2~20 h, preferably 80~160° C. and 6~12 h. The drying process may also be carried out under vacuum. Then the catalyst is prepared and stored.

Generally, according to the present invention, porous support is impregnated with soluble magnesium compound and soluble non-magnesium metal compound, a catalyst matrix supported magnesium and non-magnesium metal compound is prepared after high temperature calcination, then the catalyst matrix further reacts with organic magnesium compound, followed by reaction with titanium-containing compound or solution thereof to synthesize the support containing magnesium and non-magnesium metal compound in situ and to support the titanium species A on the surface of the porous support simultaneously. If necessary, the internal electron donor may be added into the reaction system to prepare the supported polymetal olefin polymerization catalyst.

Said step (a) relates to a method of depositing soluble magnesium compound and soluble non-magnesium metal compound onto the porous support (for example the support described above), and such method may be any method capable of depositing magnesium compound and non-magnesium metal compound onto the support, which is well known. In one embodiment of the present invention, the method of depositing magnesium compound and non-magnesium metal compound onto the support comprises impregnating porous support with a mixed solution of magnesium compound and non-magnesium metal compound, and the magnesium compound and non-magnesium metal compound may be any soluble magnesium compound and soluble non-magnesium metal compound, as described before. In one embodiment, a stirring, preferably a continuous stirring, may be carried out during the impregnation process. Generally, such stirring lasts from about 1~12 h at 0~80° C., preferably 4~8 h and room temperature~70° C. In one embodiment, the loading of magnesium is 0.5 wt %~20 wt % based on the total weight of the catalyst, the molar ratio of magnesium compound and non-magnesium metal compound is 0.1:1~30:1. Then, the resultant magnesium and non-magnesium metal-supporting support is dried, generally at room temperature~250° C., preferably 80~200° C. In one embodiment, the drying is conducted at about 120° C., and also may be carried out under vacuum. The duration period of such drying is not specially limited, but such drying generally lasts from about 2~20 h, preferably 7~18 h, further preferably 8~15 h. After drying, the magnesium and non-magnesium metal-supporting porous support is calcined. The calcining manner is not specifically limited, but is preferably conducted within a fluidized bed. In one embodiment, such calcining is carried out by two stages: a low temperature stage and high temperature stage. The low temperature stage is generally conducted at about 100~300° C., and the high temperature stage is generally conducted at about 300~900° C. Without any theoretical limitation, it is believed that the physical water of the support is removed during the low temperature stage, and soluble magnesium compound and soluble non-magnesium metal compound partially decompose. The hydroxyl radical on the porous support is partially removed during the high temperature stage, and soluble magnesium compound and soluble non-magnesium metal compound completely decompose. In one embodiment, the low temperature stage lasts from 1~10 h, preferably 2~9 h, further preferably 3~8 h. In another embodiment, the high temperature stage lasts from 1~10 h, preferably 2~9 h, further preferably 3~8 h. In one embodiment, the low temperature stage is carried out under an inert atmosphere or air, preferably an inert atmosphere, wherein the inert gas is selected from nitrogen, helium, argon, etc., preferably nitrogen, such as high purity nitrogen. In one embodiment, the calcination is carried out in air or oxygen, preferably dry air. After calcination, the resultant support supporting magnesium and non-magnesium metal-containing compound is cooled from the high temperature stage. In one embodiment, when the temperature is decreased to 300~400° C., the atmosphere may be changed, e.g. from air to inert gas, such as nitrogen, argon, etc. In one embodiment, such cooling is a natural falling of temperature.

Said step (b) relates to a method of further modifying the surface of the product obtained from step (a). In one embodiment, the product obtained from step (a) reacts with organic magnesium compound as described before. A stirring, preferably a continuous stirring, may be carried out during the reaction. Generally, such stirring lasts from about 5 min~2 h, preferably 10 min~1 h. Generally, this period is carried out at room temperature~150° C., preferably room temperature~70° C. Then $C_3$-$C_{20}$ alkane is used as washing solvent, such as n-heptane, hexane, etc. at 0~150° C., preferably room temperature~100° C. The product is dried at room temperature~250° C. for 2~20 h, preferably 60~120° C. and 6~12 h, and the drying process is also carried out under vacuum. The obtained product is then transferred under nitrogen and stored.

Said step (c) relates to a method of supporting titanium-containing compound onto a porous support and the preparation method of the catalyst. In one embodiment, the product obtained from step (b) reacts with a titanium-containing compound or solution thereof. A stirring, preferably a continuous stirring, may be carried out during the reaction. Generally, such stirring lasts from about 0.5~8 h, preferably 1~5 h. The titanium-containing compound is described as before. The molar ratio of the titanium-containing compound and the magnesium loading supported on the porous support is 0.01~500, preferably 0.1~200. Generally, this period is carried out at room temperature~200° C., preferably 80~180° C. If necessary, the internal electron donor may be added into the reaction system simultaneously, and the internal electron donor is selected from the donors described before. The molar ratio of the internal electron donor and the magnesium loading on the porous support is 0.01~500, preferably 0.1~50. $C_3$-$C_{20}$ alkane is used as a washing solvent, such as n-heptane, hexane, etc. at 0~150° C., preferably room temperature~100° C. The product is dried at room temperature~250° C. for 2~20 h, preferably 80~160° C. and 6~12 h, and the drying process is also carried out under vacuum. The obtained catalyst is then transferred under nitrogen and stored.

As an example, the specific operations for preparing the catalyst of the present invention include:

A porous amorphous silica gel is impregnated with a solution of magnesium acetate and ammonium metavanadate of a certain concentration, wherein the loading of magnesium based on the total weight of the catalyst (e.g. 0.5 wt %~20 wt %) satisfies the requirement in the present application. The molar ratio of magnesium and vanadium supported on the catalyst is 0.1:1~30:1. After being continuously stirred for a certain period of time (e.g. 4~8 h), it is then heated and dried. The silica gel support supporting magnesium acetate and ammonium metavanadate is calcined under high-temperature in a fluidized bed, wherein at the low temperature stage (e.g. 100~300° C.), the physical water of the support is removed under nitrogen and the magnesium acetate and ammonium metavanadate decompose partially. At the high temperature stage (e.g. 300~900° C.), the hydroxyl group on the surface of the silica gel is removed under dry air and magnesium acetate and ammonium metavanadate completely decompose. The high temperature stage lasts a certain period of time (e.g. 3~8 h). The product is naturally cooled down, and when the temperature is decreased to 300~400° C., the atmosphere may be changed to nitrogen. The catalyst matrix supported with magnesium and vanadium compound is prepared. Then, at a certain temperature, (e.g. room temperature~70° C.), the catalyst matrix reacts with organic magnesium compound (such as ethyl magnesium chloride), and the molar ratio of organic magnesium compound and the magnesium loading on the porous support is 0~80. After being continuously stirred (e.g. 10 min-1 h), the product is washed with hexane at a certain temperature (e.g. room temperature~100° C.) and is dried at 60~120° C. for 6~12 h under inert gas, such as nitrogen, helium, argon, etc., preferably nitrogen, and this drying process is also carried out under vacuum. The product obtained is transferred under the protection of nitrogen and stored. Finally, at a certain temperature (e.g. 80~180°

C.), the product obtained above reacts with $TiCl_4$, wherein the molar ratio of $TiCl_4$ and the magnesium loading on the porous support is 0.1~200. If necessary, the internal electron donor may be added into the reaction system, such as dibutylphthalate, and the molar ratio of internal electron donor and the magnesium loading on the porous support is 0~50. After being continuously stirred (e.g. 1~5 h), the product is washed with hexane at a certain temperature (e.g. room temperature~100° C.) and is dried at 80~160° C. for 6~12 h under inert gas, such as nitrogen, helium, argon, etc., preferably nitrogen, and this drying process is also carried out under vacuum. The catalyst is transferred under the protection of nitrogen and stored.

One embodiment of the present invention which provides the supported polymetal polyolefin catalyst comprises the steps:

a) Porous support is impregnated with a mixed solution of soluble magnesium compound and soluble non-magnesium metal compound, then is dried and calcined at high temperature of 300~900° C.;

b) The product obtained from step (a) reacts with organic aluminum compound, then is dried;

c) The product obtained from step (b) reacts with titanium-containing compound or solution thereof, if necessary, the internal electron donor may be added into the reaction system simultaneously, and then followed by washing and drying, to prepare the catalyst.

A preferred process for preparing a supported polymetal polyolefin catalyst of the present invention comprises of the steps:

a) Porous support is impregnated with a mixed solution of soluble magnesium compound and soluble non-magnesium metal compound at 0~80° C. for 0.5~12 h, preferably room temperature~70° C. and 4~8 h, then is dried at room temperature~250° C. for 2~20 h, preferably 80° C. to 200° C. and 8~15 h. The drying process may be also carried out under vacuum. Subsequently, the product is then calcined and activated in inert gas or oxygen or air at high temperature of 300~900° C. for 1~10 h, preferably 400~800° C. and 3~8 h, and then is cooled down, wherein air is replaced with an inert gas such as nitrogen or argon and the like when it is cooled to 300~400° C.

b) The product obtained from step (a) reacts with organic aluminum compound at −90~70° C. for 5 min~2 h, preferably −70~50° C. and 10 min~1 h. The product is washed by $C_3$-$C_{20}$ alkane solvent such as n-heptane, hexane, etc. at 0~150° C., preferably room temperature~100° C. The product is dried at room temperature~250° C. for 2~20 h, preferably 60~120° C. and 6~12 h, and the drying process may also be carried out under vacuum. Then the product is obtained and stored.

c) The product obtained from step (b) reacts with titanium-containing compound or solution thereof at room temperature to 200° C. for 0.5~8 h, preferably 80~180° C. and 1~5 h. If necessary, the internal electron donor may be added into the reaction system simultaneously. Then, the product is washed by $C_3$-$C_{20}$ alkane solvent such as n-heptane, hexane, etc. at 0~150° C., preferably room temperature~100° C. The product is dried at room temperature~250° C. for 2~20 h, preferably 80~160° C. and 6~12 h. The drying process may also be carried out under vacuum. Then the catalyst is prepared and stored.

Generally, according to the present invention, the porous support is impregnated with soluble magnesium compound and soluble non-magnesium metal compound, a catalyst matrix supported magnesium and non-magnesium metal compound is prepared after high temperature calcination, then the catalyst matrix further reacts with organic aluminum compound, followed by reaction with the titanium-containing compound or solution thereof to synthesize the support containing magnesium and non-magnesium metal compound in situ and to support the titanium species A on the surface of the porous support simultaneously. If necessary, the internal electron donor may be added into the reaction system to prepare the supported polymetal olefin polymerization catalyst.

Said step (a) relates to a method of depositing soluble magnesium compound and soluble non-magnesium metal compound onto the porous support (for example the support described above), and such method may be any method capable of depositing the magnesium compound and non-magnesium metal compound onto the support, which is well known. In one embodiment of the present invention, the method of depositing magnesium compound and non-magnesium metal compound onto the support comprises impregnating porous support with solution of magnesium compound and non-magnesium metal compound, wherein the magnesium compound and non-magnesium metal compound may be any soluble magnesium compound and soluble non-magnesium metal compound, as described before. In one embodiment, a stirring, preferably a continuous stirring, may be carried out during the impregnation process. Generally, such stirring lasts from about 1~12 h at 0~80° C., preferably 4~8 h and room temperature~70° C. In one embodiment, the loading of magnesium is 0.5 wt %~20 wt % based on the total weight of the catalyst, and the molar ratio of magnesium compound and non-magnesium metal compound is 0.1:1~30:1. Then, the resultant magnesium and non-magnesium-supporting support is dried, generally at room temperature~250° C., preferably 80~200° C. In one embodiment, the drying is conducted at about 120° C., and the drying process may also be carried out under vacuum. The duration period of such drying is not specially limited, but such drying generally lasts from about 2~20 h, preferably 7~18 h, further preferably 8~15 h. After drying, the magnesium and non-magnesium-supporting porous support is calcined. The calcining manner is not specifically limited, but is preferably conducted within a fluidized bed. In one embodiment, such calcining is carried out by two stages: a low temperature stage and high temperature stage. The low temperature stage is generally conducted at about 100~300° C., and the high temperature stage is generally conducted at about 300~900° C. Without any theoretical limitation, it is believed that the physical water of the support is removed during the low temperature stage, and soluble magnesium compound and soluble non-magnesium metal compound partially decompose. The hydroxyl radical on the porous support is partially removed during the high temperature stage, and soluble magnesium compound and soluble non-magnesium metal compound completely decompose. In one embodiment, the low temperature stage lasts from 1~10 h, preferably 2~9 h, further preferably 3~8 h. In another embodiment, the high temperature stage lasts from 1~10 h, preferably 2~9 h, further preferably 3~8 h. In one embodiment, the low temperature stage is carried out under an inert atmosphere or air, preferably an inert atmosphere, wherein the inert gas is selected from nitrogen, helium, argon, etc., preferably nitrogen, such as high purity nitrogen. In one embodiment, the calcination is carried out in air or oxygen, preferably dry air. After calcination, the resultant support supporting magnesium and non-magnesium-containing compound is cooled from the high temperature stage. In one embodiment, when the temperature is decreased to 300~400° C., the atmosphere may be changed, e.g. from air to inert gas, such as nitrogen, argon, etc. In one embodiment, such cooling is a natural falling of temperature.

Said step (b) relates to a method of further modifying the surface of the product obtained from step (a). In one embodiment, the product obtained from step (a) reacts with the organic aluminum compound, as described before. The molar ratio of organic aluminum compound and the magnesium supporting on the porous support is 0~100, preferably 0~80. A stirring, preferably a continuous stirring, may be carried out during the reaction. Generally, such stirring lasts from about 5 min~2 h, preferably 10 min~1 h. Generally, this period is carried out at −90~70° C., preferably −70~50° C. Then $C_3$-$C_{20}$ alkane is used as a washing solvent, such as n-heptane, hexane, etc. at 0~150° C., preferably room temperature~100° C. The product is dried at room temperature~250° C. for 2~20 h, preferably 60~120° C. and 6~12 h, and the drying process is also carried out under vacuum. The obtained product is then transferred under nitrogen and stored.

Said step (c) relates to a method of supporting the titanium-containing compound onto porous support and the preparation method of the catalyst. In one embodiment, the product obtained from step (b) reacts with the titanium-containing compound or solution thereof. A stirring, preferably a continuous stirring, may be carried out during the reaction. Generally, such stirring lasts from about 0.5~8 h, preferably 1~5 h. The titanium-containing compound is described before. The molar ratio of the titanium-containing compound and the magnesium loading supported on the porous support is 0.01~500, preferably 0.1~200. Generally, this period is carried out at room temperature~200° C., preferably 80~180° C. If necessary, the internal electron donor may be added into the reaction system simultaneously, and the internal electron donor is selected from the donors described before. The molar ratio of the internal electron donor and the magnesium loading on the porous support is 0.01~500, preferably 0.1~50. $C_3$-$C_{20}$ alkane is used as a washing solvent, such as n-heptane, hexane, etc. at 0~150° C., preferably room temperature~100° C. The product is dried at room temperature~250° C. for 2~20 h, preferably 80~160° C. and 6~12 h, and the drying process is also carried out under vacuum. The obtained catalyst is then transferred under nitrogen and stored.

As an example, the specific operations for preparing the catalyst of the present invention include:

A porous amorphous silica gel is impregnated with a solution of magnesium acetate and ammonium metavanadate of a certain concentration, wherein the loading of magnesium based on the total weight of the catalyst (e.g. 0.5 wt %~20 wt %) satisfies the requirement in the present application. The molar ratio of magnesium and vanadium supported on the catalyst is 0.1:1~30:1. After being continuously stirred for a certain period of time (e.g. 4~8 h), it is then heated and dried. The silica gel support supporting magnesium acetate and ammonium metavanadate is calcined under high-temperature in a fluidized bed, wherein at the low temperature stage (e.g. 100~300° C.), the physical water of the support is removed under nitrogen and the magnesium acetate and ammonium metavanadate partially decompose. At the high temperature stage (e.g. 300~900° C.), the hydroxyl group on the surface of the silica gel is removed under dry air and the magnesium acetate and ammonium metavanadate completely decompose. The high temperature stage lasts a certain period of time (e.g. 3~8 h). The product is naturally cooled down, and when the temperature is decreased to 300~400° C., the atmosphere may be changed to nitrogen. The catalyst matrix supported with the magnesium and vanadium compound is prepared. Then, at a certain temperature (e.g. −70~50° C.), the catalyst matrix reacts with triethylaluminium, and the molar ratio of organic aluminum compound and the magnesium loading on the porous support is 0~80. After being continuously stirred (e.g. 10 min~1 h), the product is washed with hexane at a certain temperature (e.g. room temperature~100° C.) and dried at 60~120° C. for 6~12 h under inert gas, such as nitrogen, helium, argon, etc., preferably nitrogen, and this drying process is also carried out under vacuum. The product obtained is transferred under the protection of nitrogen and stored. Finally, at a certain temperature (e.g. 80~180° C.), the product obtained above reacts with $TiCl_4$. The molar ratio of $TiCl_4$ and the magnesium loading on the porous support is 0.1~200. If necessary, the internal electron donor may be added into the reaction system, such as dibutylphthalate. The molar ratio of internal electron donor and the magnesium loading on the porous support is 0~50. After being continuously stirred (e.g. 1~5 h), the product is washed with hexane at a certain temperature (e.g. room temperature~100° C.) and is dried at 80~160° C. for 6~12 h under inert gas, such as nitrogen, helium, argon, etc., preferably nitrogen, and this drying process is also carried out under vacuum. The catalyst is transferred under the protection of nitrogen and stored.

The present invention also provides the applications of a supported polymetal olefin polymerization catalyst for the catalytic polymerization of ethylene, propylene, butene, hexene or octene, or copolymerizations thereof.

The polymerization or copolymerization reaction includes an introduction of hydrogen.

The olefin(s) used for polymerization generally comprises ethylene or propylene as a polymerization monomer. In one embodiment, comonomer may be $C_3$-$C_{20}$ α-olefin, e.g. propylene, 1-butene, 1-pentene, 1-hexene, 1-heptene, 1-octene, 1-nonene, 1-decene, 1-dodecylene, 4-methyl-1-pentene, 4-methyl-1-hexene, etc. These monomers may be used alone or combinations of two or more. The comonomer is preferably selected from 1-butene, 1-hexene, 1-octene and 1-decene. Ethylene may also be used as comonomer when α-olefinis is polymerized. In the presence of the comonomer, the amount of comonomer generally ranges from 0~30 vol %, preferably 0~20 vol % which is based on the volume of the solvent used during the polymerization.

According to the application of a supported polymetal olefin polymerization catalyst, an organometallic cocatalyst, an external donor, or a molecular weight modifier may be added into the polymerization or copolymerization reaction. Among them, the molar ratio of organometallic cocatalyst and the titanium supported is 0~300; the molar ratio of external donor and the titanium supported is 0.1~300.

Organometallic cocatalysts as described above may be organoaluminum compound including triethylaluminum, triisobutylaluminum, diethyl ethoxyaluminum, monochloro diethylaluminum, ethoxydiethyl aluminum, methylaluminoxane, etc., and combinations thereof.

External electron donors may be selected from alkoxysilane compound or other monocarboxylic acids, polycarboxylic acids, carboxylic acid anhydrides, carboxylic acid esters, aromatic esters, ketones, ethers, alcohols, amines, lactones, organophosphorus compounds, alkoxysilane compounds, etc., or combinations thereof, as shown in figure (V), which are generally well-known as external electron donors in the art for olefinpolymerization.

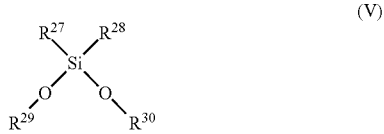

(V)

Wherein, $R^{27}$-$R^{30}$ may be the same or different hydrogen atoms or $C_1$-$C_{20}$ alkyl, which may be saturated or unsaturated straight-chain, branched or cyclic chain (including aromatic hydrocarbons). The external electron donor is selected from: methyl formate, ethyl acetate, butyl acetate, ethyl ether, hexyl ether, tetrahydrofuran (THF), acetone, methyl isobutyl ketone, methyl benzoate, ethyl benzoate, diethyl phthalate, n-butyl phthalate, N-propyltrimethoxysilane, methyltrimethoxysilane, N-octyltrimethoxysilane, n-butyl methyldimethoxysilane, phenytri ethoxysilane, cyclohexyl dimethoxysilane, dicyclopentyl dimethoxysilane, diisopropyl dimethoxysilane, diisobutyl dimethoxysilane, etc., and combinations thereof.

The molecular weight regulator as described is hydrogen.

As for the aforesaid process for preparing polymers, there is no special limitation to the polymerization process. The processes for preparing olefin polymers by using the supported polymetal catalyst of the present invention may include gas phase polymerization, slurry polymerization, suspension polymerization, bulk polymerization, solution polymerization, etc.

In one embodiment, a slurry polymerization is used, in which an ethylene or propylene is added into the reactor, and then a solvent and cocatalyst (such as organoaluminumaluminum compound), and optionally, hydrogen, external electron donor, comonomer(s), etc. is (are) added. Finally the polymerization of the supported polymeta olefin polymerization catalyst of the present invention is started.

The solvent used in the slurry polymerization is any solvent for olefin polymerization generally well-known in the art. The solvent may be $C_3$-$C_{20}$ alkanes, such as propane, n-butane, isobutane, n-pentane, isopentane, neopentane, n-hexane, cyclohexane, n-heptane, n-octane, etc. These solvents may be used alone or combinations of two or more. The solvent is preferably isobutane, pentane, hexane, cyclohexane, n-heptane, etc.

In one embodiment, the polymerization is carried out using conventional slurry polymerization, as follows: the polymerization reactor is firstly heated under vacuum, and then is replaced with highly pure nitrogen, which is repeated for three times. A small amount of monomeric ethylene is further used to replace once. Finally, the reactor is filled with ethylene or propylene to a slightly positive pressure (0.12 MPa); then a refined solvent, such as n-heptane treated by dehydration and deoxidation, and a certain amount of alkylaluminium as cocatalyst are added into the reactor. In the hydrogen regulation and copolymerization experiments, a certain amount of hydrogen and comonomer(s) is/are added into the system, respectively, and the external electron donor may be added in propylene polymerization. Finally, when the pressure of ethylene or propylene is adjusted to 0.15 MPa, the catalyst of the present invention is added to start the polymerization reaction. The instantaneous consumption of monomeric ethylene or propene is on-line collected (by a high-precision ethylene or propylene mass flow meter connecting with a computer) during the reaction and recorded by the computer at a certain temperature (e.g. 35~100° C.) for a certain period of time (e.g. 1 h), and the reaction is quenched by the addition of a hydrochloric acid/ethanol mixed solution. The polymer is washed, vacuum dried, weighed, and analyzed.

The present invention provides a supported polymetal olefin polymerization catalyst as a highly efficient composite supported polymetal Ziegler-Natta catalyst. Porous support and any inexpensive soluble magnesium compound and non-magnesium metal compound are used as raw materials to synthesize the support containing magnesium compound and non-magnesium metal compound in situ and to support the titanium species simultaneously. Through further introduction of non-magnesium compound (including main group metals, transition metals, etc. other than magnesium) during catalyst preparation, the present invention has the advantages of simple preparation method, low cost, controllable catalyst morphology and catalyst performance, etc. Also, the resulting composite supported catalyst exhibits significantly improved catalytic performances in olefin polymerization, such as polymerization activity, hydrogen response, copolymerization performance, etc., showing a great industrial application prospect. Using the supported polymetal olefin polymerization catalyst of the present invention, the molecular weight, molecular weight distribution, comonomer content and conmonomer distribution of the olefin polymers and olefin copolymers can be adjusted easily by just changing the cocatalyst type, cocatalyst amount, molecular weight regulator, etc. to obtain desired products.

BRIEF DESCRIPTION OF THE DRAWINGS

FIG. 1 represents the calcination process of the matrix of the supported polymetal olefin polymerization catalyst.

DETAILED DESCRIPTION OF PREFERRED EMBODIMENTS

Preferred embodiments of the present invention will be described with reference to the accompanying drawings.

The present invention is more detailedly illustrated by reference to the following examples, but is not limited by these examples. The silica gel used in the examples is a commercially available Davison 955.

The properties of polymers are measured as follows:
High Temperature Gel Permeation Chromatography (HT-GPC)

The molecular weight and molecular weight distribution of polymers were measured by HT-GPC (PL-220, Polymer Laboratories Company) using 1,2,4-trichlorobenzene as solvent at 160° C. The data obtained is processed by the universal method of correction based on the narrow-distributed polystyrene standard products.
Differential Scanning Calorimetry (DSC)

The melting point of polymers was measured by DSC (TAQ200) at the protection of nitrogen. The sample was heated from room temperature to 150° C. at 10° C./min and kept the temperature for 5 min, then naturally cooled down to room temperature. DSC curve was recorded according to the temperature increased scanning at 10° C./min.

Example 1

10 g of silica gel (pore volume of 1.5-1.7 $cm^3$/g and surface area of 250-300 $m^2$/g) was impregnated with solution of magnesium nitrate and vanadium nitrate (Mg loading was 10 wt %, the molar ratio of magnesium and vanadium was 1:1). After being continuously stirred for 5 h at room temperature, it was heated to 120° C. for drying 5 h and was dried at 120° C. for 6 h in drying oven. The silica gel support supporting magnesium nitrate and vanadium nitrate was calcined in a fluidized bed. Nitrogen was used before the temperature reached 300° C. Then, atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the product (catalyst matrix) obtained reacted with 30 ml $TiCl_4$ at 140° C. for 2 h and washed with n-hexane several times at room temperature. Finally, the product was dried under vacuum and the catalyst was obtained.

Example 2

10 g of silica gel (pore volume of 1.5-1.7 $cm^3/g$ and surface area of 250-300 $m^2/g$) was impregnated with a solution of magnesium acetate and ammonium metavanadate (Mg loading was 5 wt %, the molar ratio of magnesium and vanadium was 1:1). After being continuously stirred for 5 h at room temperature, it was heated to 120° C. for drying 5 h and was dried at 120° C. for 6 h in drying oven. The silica gel support supporting magnesium acetate and ammonium metavanadate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml $TiCl_4$ at 140° C. for 2 hand was washed with n-hexane several times at room temperature. Finally, the product was dried under vacuum and the catalyst was obtained.

Example 3

10 g of silica gel (pore volume of 1.5-1.7 $cm^3/g$ and surface area of 250-300 $m^2/g$) was impregnated with a solution of magnesium acetate and ammonium metavanadate (Mg loading was 5 wt %, the molar ratio of magnesium and vanadium was 5:1). After being continuously stirred for 5 h at room temperature, it was heated to 120° C. for drying 5 h and was dried at 120° C. for 6 h in drying oven. The silica gel support supporting magnesium acetate and ammonium metavanadate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of obtained product (catalyst matrix) reacted with 30 ml $TiCl_4$ at 140° C. for 2 h, and was washed with n-hexane several times at room temperature. Finally, the product was dried under vacuum and the catalyst was obtained.

Example 4

10 g of silica gel (pore volume of 1.5-1.7 $cm^3/g$ and surface area of 250-300 $m^2/g$) was impregnated with a solution of magnesium acetate and ammonium metavanadate (Mg loading was 5 wt %, the molar ratio of magnesium and vanadium was 10:1). After being continuously stirred for 5 h at room temperature, it was heated to 120° C. for drying 5 h and was dried at 120° C. for 6 h in drying oven. The silica gel support supporting magnesium acetate and ammonium metavanadate was calcined in a fluidized bed. Nitrogen was used before the temperature reached 300° C., Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml $TiCl_4$ at 140° C. for 2 h and was washed with n-hexane several times at room temperature. Finally, the product was dried under vacuum and the catalyst was obtained.

Example 5

10 g of silica gel (pore volume of 1.5-1.7 $cm^3/g$ and surface area of 250-300 $m^2/g$) was impregnated with a solution of magnesium acetate and ammonium metavanadate (Mg loading was 0.5 wt %, the molar ratio of magnesium and vanadium was 0.1:1). After being continuously stirred for 5 h at room temperature, it was heated to 120° C. for drying 5 h and was dried at 120° C. for 6 h in drying oven. The silica gel support supporting magnesium acetate and ammonium metavanadate was calcined in a fluidized bed. Nitrogen was used before the temperature reached 300° C. Then the atmosphere was changed to high purity air and kept at 600° C. for 4 h. The product was naturally cooled down to 400° C. under the protection of nitrogen gas. The high temperature calcining and then cooling processes above are shown in FIG. 1. Then, the obtained product reacted with ethyl magnesium chloride (molar ratio of organic Mg/Mg supported was 0.1) at 25° C. for 30 min. 2 g of the obtained product (catalyst matrix) above reacted with 30 ml $TiCl_4$ at 140° C. for 2 h and was washed with n-hexane several times at room temperature. Finally, the product was dried under vacuum and the catalyst was obtained.

Example 6

10 g of silica gel (pore volume of 1.5-1.7 $cm^3/g$ and surface area of 250-300 $m^2/g$) was impregnated with a solution of magnesium acetate and ammonium metavanadate (Mg loading was 3 wt %, the molar ratio of magnesium and vanadium was 20:1). After being continuously stirred for 5 h at room temperature, it was heated to 120° C. for drying 5 h and was dried at 120° C. for 6 h in drying oven. The silica gel support supporting magnesium acetate and ammonium metavanadate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. Then, the obtained product reacted with triethylaluminium (molar ratio of organic Al/Mg supported was 0.1) at 25° C. for 30 min. 2 g of the obtained product (catalyst matrix) reacted with 30 ml $TiCl_4$ at 140° C. for 2 h, and was washed with n-hexane several times at room temperature. Finally, the product was dried under vacuum and the catalyst was obtained.

Example 7

10 g of silica gel (pore volume of 1.5-1.7 $cm^3/g$ and surface area of 250-300 $m^2/g$) was impregnated with a solution of magnesium acetate and aluminium nitrate (Mg loading was 1 wt %, the molar ratio of magnesium and aluminium was 30:1). After being continuously stirred for 5 h at room temperature, it was heated to 120° C. for drying 5 h and was dried at 120° C. for 6 h in drying oven. The silica gel support supporting magnesium acetate and ammonium nitrate was calcined in a fluidized bed. Nitrogen was used before the temperature reached 300° C., and then atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml TiCl$_4$ at 140° C. for 2 h and was washed with n-hexane several times at room temperature. Finally, the product was dried under vacuum and the catalyst was obtained.

Example 8

10 g of silica gel (pore volume of 1.5-1.7 cm$^3$/g and surface area of 250-300 m$^2$/g) was impregnated with a solution of magnesium acetate and zirconium nitrate (Mg loading was 8 wt %, the molar ratio of magnesium and zirconium was 3:1). After being continuously stirred for 5 h at room temperature, it was heated to 120° C. for drying 5 h and was dried at 120° C. for 6 h in drying oven. The silica gel support supporting magnesium acetate and zirconium nitrate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml TiCl$_4$ at 140° C. for 2 h and was washed with n-hexane several times at room temperature. Finally, the product was dried under vacuum and the catalyst was obtained.

Example 9

10 g of silica gel (pore volume of 1.5-1.7 cm$^3$/g and surface area of 250-300 m$^2$/g) was impregnated with a solution of magnesium acetate and zinc nitrate (Mg loading was 15 wt %, the molar ratio of magnesium and zinc was 25:1). After being continuously stirred for 5 h at room temperature, it was heated to 120° C. for drying 5 h and was dried at 120° C. for 6 h in drying oven. The silica gel support supporting magnesium acetate and zinc nitrate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. Then, the obtained product reacted with ethyl magnesium chloride (molar ratio of organic Mg/Mg supported was 0.1) at 25° C. for 30 min. 2 g of the obtained product (catalyst matrix) reacted with 30 ml TiCl$_4$ at 140° C. for 2 h, and was washed with n-hexane several times at room temperature. Finally, the product was dried under vacuum and the catalyst was obtained.

Example 10

10 g of silica gel (pore volume of 1.5-1.7 cm$^3$/g and surface area of 250-300 m$^2$/g) was impregnated with a solution of magnesium acetate and copper nitrate (Mg loading was 20 wt %, the molar ratio of magnesium and copper was 30:1). After being continuously stirred for 5 h at room temperature, it was heated to 120° C. for drying 5 h and was dried at 120° C. for 6 h in drying oven. The silica gel support supporting magnesium acetate and copper nitrate was calcined in a fluidized bed. Nitrogen was used before the temperature reached 300° C. Then the atmosphere was changed to high purity air and kept at 600° C. for 4 h. The product was naturally cooled down to 400° C. under the protection of nitrogen gas. The high temperature calcining and then cooling processes above are shown in FIG. 1. Then, the obtained product reacted with triethylaluminium (molar ratio of organic Al/Mg supported was 0.1) at 25° C. for 30 min. 2 g of the obtained product (catalyst matrix) reacted with 30 ml TiCl$_4$ at 140° C. for 2 h and was washed with n-hexane several times at room temperature. Finally, the product was dried under vacuum and the catalyst was obtained.

Example 11

10 g of silica gel (pore volume of 1.5-1.7 cm$^3$/g and surface area of 250-300 m$^2$/g) was impregnated with a solution of magnesium acetate and ferric nitrate (Mg loading was 17 wt %, the molar ratio of magnesium and ferrum was 8:1). After being continuously stirred for 5 h at room temperature, it was heated to 120° C. for drying 5 h and was dried at 120° C. for 6 h in drying oven. The silica gel support supporting magnesium acetate and ferric nitrate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml TiCl$_4$ at 140° C. for 2 h and was washed with n-hexane several times at room temperature. Finally, the product was dried under vacuum and the catalyst was obtained.

Example 12

10 g of silica gel (pore volume of 1.5-1.7 cm$^3$/g and surface area of 250-300 m$^2$/g) was impregnated with a solution of magnesium acetate and ammonium metavanadate (Mg loading was 5 wt %, the molar ratio of magnesium and vanadium was 10:1). After being continuously stirred for 5 h at room temperature, it was heated to 120° C. for drying 5 h and was dried at 120° C. for 6 h in drying oven. The silica gel support supporting magnesium acetate and ammonium metavanadate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml TiCl$_4$ and a certain amount of ethyl benzoate at 140° C. for 2 h, the volume ratio of titanium species and the internal electron donor was 15, and was washed with n-hexane several times at room temperature. Finally, the product was dried under vacuum and the catalyst was obtained.

Example 13

10 g of silica gel (pore volume of 1.5-1.7 cm$^3$/g and surface area of 250-300 m$^2$/g) was impregnated with a solution of magnesium acetate and ammonium metavanadate (Mg loading was 5 wt %, the molar ratio of magnesium and vanadium was 10:1). After being continuously stirred for 5 h at room temperature, it was heated to 120° C. for drying 5 h and was dried at 120° C. for 6 h in drying oven. The silica gel support supporting magnesium acetate and ammonium metavanadate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml $TiCl_4$ and a certain amount of dibutyl phthalate at 140° C. for 2 h, the volume ratio of titanium species and internal electron donor was 15, and was washed with n-hexane several times at room temperature. Finally, the product was dried under vacuum and the catalyst was obtained.

Example 14

10 g of silica gel (pore volume of 1.5-1.7 $cm^3$/g and surface area of 250-300 $m^2$/g) was impregnated with a solution of magnesium acetate and ammonium metavanadate (Mg loading was 5 wt %, the molar ratio of magnesium and vanadium was 30:1). After being continuously stirred for 5 h at room temperature, it was heated to 120° C. for drying 5 h and was dried at 120° C. for 6 h in drying oven. The silica gel support supporting magnesium acetate and ammonium metavanadate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml $TiCl_4$ at 140° C. for 2 h and was washed with n-hexane several times at room temperature. Finally, the product was dried under vacuum and the catalyst was obtained.

Example 15

10 g of aluminium oxide was impregnated with solution of magnesium bicarbonate and molybdenum acetate (Mg loading was 5 wt %, the molar ratio of magnesium and molybdenum was 5:1). After being continuously stirred for 5 h at room temperature, it was heated to 120° C. for drying 5 h and was dried at 120° C. for 6 h in drying oven. The aluminum oxide support supporting the magnesium bicarbonate and molybdenum acetate was calcined in a fluidized bed. Nitrogen was used before the temperature reached 300° C. Then the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml triethoxy titanium chloride at 140° C. for 2 h, and was washed with n-hexane several times at room temperature. Finally, the product was dried under vacuum and the catalyst was obtained.

Example 16

10 g of aluminosilicate was impregnated with a solution of magnesium chromate and molybdenum nitrate (Mg loading was 5 wt %, the molar ratio of magnesium and molybdenum was 12:1). After being continuously stirred for 5 h at room temperature, it was heated to 120° C. for drying 5 h and was dried at 120° C. for 6 h in drying oven. The aluminosilicate support supporting the magnesium chromate and molybdenum nitrate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml diethoxy titanium dichloride at 140° C. for 2 h and was washed with n-hexane several times at room temperature. Finally, the product was dried under vacuum and the catalyst was obtained.

Example 17

10 g of titanium dioxide was impregnated with a solution of magnesium fluoride and vanadyl sulfate (Mg loading was 5 wt %, the molar ratio of magnesium and vanadium was 5:1). After being continuously stirred for 5 h at room temperature, it was heated to 120° C. for drying 5 h and was dried at 120° C. for 6 h in drying oven. The titanium dioxide support supporting the magnesium fluoride and vanadyl sulfate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml methoxy titanium trichloride at 140° C. for 2 h, and was washed with n-hexane several times at room temperature. Finally, the product was dried under vacuum and the catalyst was obtained.

Example 18

10 g of zirconia was impregnated with a solution of magnesium sulfate and ammonium metavanadate (Mg loading was 5 wt %, the molar ratio of magnesium and vanadium was 20:1). After being continuously stirred for 5 h at room temperature, it was heated to 120° C. for drying 5 h and was dried at 120° C. for 6 h in drying oven. The zirconia support supporting the magnesium sulfate and ammonium metavanadate was calcined in a fluidized bed. Nitrogen was used before the temperature reached 300° C. The, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml titanium trichloride at 140° C. for 2 h, and was washed with n-hexane several times at room temperature. Finally, the product was dried under vacuum and the catalyst was obtained.

Example 19

10 g of aluminium oxide was impregnated with a solution of magnesium sulfide and wolframium nitrate (Mg loading was 3 wt %, the molar ratio of magnesium and wolframium was 5:1). After being continuously stirred for 5 h at room temperature, it was heated to 120° C. for drying 5 h and was dried at 120° C. for 6 h in drying oven. The aluminum oxide support supporting the magnesium sulfide and wolframium nitrate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml triethoxy titanium chloride and a certain amount of THF at 140° C. for 2 h, the volume ratio of titanium species and the internal electron donor was 15, and was washed with n-hexane several times at room temperature. Finally, the product was dried under vacuum and the catalyst was obtained.

Example 20

10 g of aluminum oxide was impregnated with a solution of magnesium bicarbonate and wolframium carbonate (Mg loading was 5 wt %, the molar ratio of magnesium and wolframium was 10:1). After being continuously stirred for 5 h at room temperature, it was heated to 120° C. for drying 5 h and was dried at 120° C. for 6 h in drying oven. The aluminum oxide support supporting the magnesium bicarbonate and wolframium carbonate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml of methoxy titanium trichloride and a certain amount of methyl isobutyl ketone at 140° C. for 2 h, the volume ratio of titanium species and the internal electron donor was 15, and was washed with n-hexane several times at room temperature. Finally, the product was dried under vacuum and the catalyst was obtained.

Example 21

10 g of zirconia was impregnated with a solution of magnesium chlorate and ferric nitrate (Mg loading was 5 wt %, the molar ratio of magnesium and ferrum was 10:1). After being continuously stirred for 5 h at room temperature, it was heated to 120° C. for drying 5 h and was dried at 120° C. for 6 h in drying oven. The zirconia support supporting the magnesium chlorate and ferric nitrate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml of diethoxy titanium dichloride and a certain amount of 2-ethyl butyl acetate at 140° C. for 2 h, the volume ratio of titanium species and internal electron donor was 15, and was washed with n-hexane several times at room temperature. Finally, the product was dried under vacuum and the catalyst was obtained.

Example 22

10 g of titanium dioxide was impregnated with a solution of magnesium phosphate and nickel nitrate (Mg loading was 5 wt %, the molar ratio of magnesium and nickel was 10:1). After being continuously stirred for 5 h at room temperature, it was heated to 120° C. for drying 5 h and was dried at 120° C. for 6 h in drying oven. The titanium dioxide support supporting the magnesium phosphate and nickel nitrate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml of titanium trichloride and a certain amount of diethyl ether at 140° C. for 2 h, the volume ratio of titanium species and internal electron donor was 15, and was washed with n-hexane several times at room temperature. Finally, the product was dried under vacuum and the catalyst was obtained.

Example 23

10 g of silica gel (pore volume of 1.5-1.7 cm$^3$/g and surface area of 250-300 m$^2$/g) was impregnated with a solution of magnesium acetate and chromium acetate (Mg loading was 5 wt %, the molar ratio of magnesium and chromium was 5:1). After being continuously stirred for 5 h at room temperature, it was heated to 120° C. for drying 5 h and was dried at 120° C. for 6 h in drying oven. The silica gel support supporting magnesium acetate and chromium acetate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml TiCl$_4$ at 140° C. for 2 h, and was washed with n-hexane several times at room temperature. Finally, the product was dried under vacuum and the catalyst was obtained.

Example 24

10 g of silica gel (pore volume of 1.5-1.7 cm$^3$/g and surface area of 250-300 m$^2$/g) was impregnated with a solution of magnesium acetate and chromium acetate (Mg loading was 5 wt %, the molar ratio of magnesium and chromium was 10:1). After being continuously stirred for 5 h at room temperature, it was heated to 120° C. for drying 5 h and was dried at 120° C. for 6 h in drying oven. The silica gel support supporting magnesium acetate and chromium acetate was calcined in a fluidized bed. Nitrogen was used before the temperature reached 300° C. The, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml TiCl$_4$ at 140° C. for 2 h, and was washed with n-hexane several times at room temperature. Finally, the product was dried under vacuum and the catalyst was obtained.

Example 25

10 g of silica gel (pore volume of 1.5-1.7 cm$^3$/g and surface area of 250-300 m$^2$/g) was impregnated with a solution of magnesium acetate and chromium acetate (Mg loading was 5 wt %, the molar ratio of magnesium and chromium was 15:1). After being continuously stirred for 5 h at room temperature, it was heated to 120° C. for drying 5 h and was dried at 120° C. for 6 h in drying oven. The silica gel support supporting magnesium acetate and chromium acetate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml $TiCl_4$ at 140° C. for 2 h, and was washed with n-hexane several times at room temperature. Finally, the product was dried under vacuum and the catalyst was obtained.

Example 26

10 g of silica gel (pore volume of 1.5-1.7 $cm^3/g$ and surface area of 250-300 $m^2/g$) was impregnated with a solution of magnesium acetate and molybdenum acetate (Mg loading was 5 wt %, the molar ratio of magnesium and molybdenum was 10:1). After being continuously stirred for 5 h at room temperature, it was heated to 120° C. for drying 5 h and was dried at 120° C. for 6 h in drying oven. The silica gel support supporting magnesium acetate and molybdenum acetate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml $TiCl_4$ at 140° C. for 2 h, and was washed with n-hexane several times at room temperature. Finally, the product was dried under vacuum and the catalyst was obtained.

Example 27

10 g of silica gel (pore volume of 1.5-1.7 $cm^3/g$ and surface area of 250-300 $m^2/g$) was impregnated with a solution of magnesium acetate and wolframium acetate (Mg loading was 5 wt %, the molar ratio of magnesium and wolframium was 10:1). After being continuously stirred for 5 h at room temperature, it was heated to 120° C. for drying 5 h and was dried at 120° C. for 6 h in drying oven. The silica gel support supporting magnesium acetate and wolframium acetate was calcined in a fluidized bed. Nitrogen was used before the temperature reached 300° C. Then, the atmosphere was changed to high purity air and kept at 600° C. for 4 h. The product was naturally cooled down to 400° C. under the protection of nitrogen gas. The high temperature calcining and then cooling processes above are shown in FIG. 1. 2 g of the obtained product (catalyst matrix) reacted with 30 ml of $TiCl_4$ at 140° C. for 2 h, and was washed with n-hexane several times at room temperature. Finally, the product was dried under vacuum and the catalyst was obtained.

Example 28

100 mg of the catalyst in Example 1 was weighed for the polymerization. The polymerization reactor was first heated under vacuum, and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=1) as a cocatalyst were successively added into the reactor. Another 40 ml of n-heptane was added into the reactor, and the pressure of ethylene was raised to 0.15 MPa. Then, the catalysts were added to start the polymerization, after the temperature in the reactor was kept at 70° C. The instantaneous consumption of monomeric ethylene was collected electronically (by the high-precision ethylene mass flow meter connecting with a computer) during the reaction and was recorded by the computer. After 1 h, the reaction was quenched with 50 ml of a mixed solution of hydrochloric acid/ethanol. The polymer was vacuum dried at 60° C. for 4 h, weighed, and analyzed.

Example 29

100 mg of the catalyst in Example 2 was weighed for the polymerization. The polymerization reactor was first heated under vacuum, and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=5, 10, 15, 25) as a cocatalyst were successively added into the reactor (corresponded to Example 29-1, 29-2, 29-3, 29-4, respectively). Another 40 ml of n-heptane was added into the reactor and the pressure of ethylene was raised to 0.15 MPa. Then, the catalysts were added to start the polymerization, after the temperature in the reactor was kept at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 30

100 mg of the catalyst in Example 3 was weighed for the polymerization. The polymerization reactor was first heated under vacuum, and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=5, 10, 15, 25) as a cocatalyst were successively added into the reactor (corresponded to Example 30-1, 30-2, 30-3, 30-4, respectively). Another 40 ml of n-heptane was added into the reactor and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 31

100 mg of the catalyst in Example 4 was weighed for the polymerization. The polymerization reactor was first heated under vacuum, and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=5, 10, 15, 25) as a cocatalyst were successively added into the reactor (corresponded to Example 31-1, 31-2, 31-3, 31-4, respectively). Another 40 ml of n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 32

100 mg of the catalyst in Example 5 was weighed for the polymerization. The polymerization reactor was first heated under vacuum, and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of diethylaluminum chloride (DEAC, Al/Ti=0.25) as a cocatalyst were successively added into the reactor. Another 40 ml of n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 33

100 mg of the catalyst in Example 6 was weighed for the polymerization. The polymerization reactor was first heated under vacuum, and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triethylaluminum (TEA, Al/Ti=0.5) as a cocatalyst were successively added into the reactor. Another 40 ml of n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 34

100 mg of the catalyst in Example 7 was weighed for the polymerization. The polymerization reactor was first heated under vacuum, and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=1) as a cocatalyst were successively added into the reactor. Another 40 ml of n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 35

100 mg of the catalyst in Example 8 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=50) as a cocatalyst were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 36

100 mg of the catalyst in Example 9 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=60) as a cocatalyst were successively added into the reactor. Another 40 ml of n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 37

100 mg of the catalyst in Example 10 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=100) as a cocatalyst were successively added into the reactor. Another 40 ml of n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 38

100 mg of the catalyst in Example 11 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=80) as a cocatalyst were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 39

100 mg of the catalyst in Example 12 was weighed for the polymerization. The polymerization reactor was first heated under vacuum and then replaced with highly pure nitrogen. This was repeated three times. A small amount of monomeric propylene was used to replace once. The reactor was filled with propylene to a slightly positive pressure (0.12 MPa). 40 ml of refined n-heptane as a solvent, a certain amount of triisobutyl aluminium (TiBA, Al/Ti=120) as a cocatalyst and a certain amount of bis-cyclopentyl dimethoxysilane (DCPMS/Ti=10) were successively added into the reactor. Another 40 ml of n-heptane was added into the reactor and the pressure of propylene was raised to 0.15 MPa. Then, the catalysts were added to start the polymerization, after the temperature in the reactor was maintained at 70° C. The instantaneous consumption of monomeric propylene was electronically collected (by the high-precision propylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 40

100 mg of the catalyst in Example 13 was weighed for the polymerization. The polymerization reactor was first heated under vacuum and then replaced with highly pure nitrogen. This was repeated three times. A small amount of monomeric propylene was used to replace once. The reactor was filled with propylene to a slightly positive pressure (0.12 MPa). 40 ml of refined n-heptane as a solvent, a certain amount of triisobutyl aluminium (TiBA, Al/Ti=150) as a cocatalyst, and a certain amount of bis-cyclopentyl dimethoxysilane (DCPMS/Ti=10) were successively added into the reactor. Another 40 ml n-heptane was added into the reactor, and the pressure of propylene was raised to 0.15 MPa. Then, the catalysts were added to start the polymerization, after the temperature in the reactor was maintained at 70° C. The instantaneous consumption of monomeric propylene was electronically collected (by the high-precision propylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 41

100 mg of the catalyst in Example 14 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=180) as a cocatalyst were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 42

100 mg of the catalyst in Example 15 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=200) as a cocatalyst were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 43

100 mg of the catalyst in Example 16 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=300) as a cocatalyst were successively added into the reactor. Another 40 ml of n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml mixed solution of hydrochloric acid/ethanol. The polymer was vacuum dried at 60° C. for 4 h, weighed, and analyzed.

Example 44

100 mg of the catalyst in Example 17 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=220) as a cocatalyst were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol, and the polymer was vacuum dried at 60° C. for 4 h, weighed, and analyzed.

Example 45

100 mg of the catalyst in Example 18 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of methylaluminoxane (MAO, Al/Ti=70) as a cocatalyst were successively added into the reactor. Another 40 ml n-heptane was added into the reactor, and the pressure of ethylene was raised to 0.15 MPa. Then, the catalysts were added to start the polymerization after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 46

100 mg of the catalyst in Example 19 was weighed for the polymerization. The polymerization reactor was first heated under vacuum and then replaced with highly pure nitrogen. This was repeated three times. A small amount of monomeric propylene was used to replace once. The reactor was filled with propylene to a slightly positive pressure (0.12 MPa). 40 ml of refined n-heptane as a solvent, a certain amount of triisobutyl aluminium (TiBA, Al/Ti=300) as a cocatalyst, and a certain amount of bis-cyclopentyl dimethoxysilane (DCPMS/Ti=10) were successively added into the reactor. Another 40 ml n-heptane was added into the reactor, and the pressure of propylene was raised to 0.15 MPa. Then, the catalysts were added to start the polymerization, after the temperature in the reactor was maintained at 70° C. The instantaneous consumption of monomeric propylene was electronically collected (by the high-precision propylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 47

100 mg of the catalyst in Example 20 was weighed for the polymerization. The polymerization reactor was first heated under vacuum and then replaced with highly pure nitrogen. This was repeated three times. A small amount of monomeric propylene was used to replace once. The reactor was filled with propylene to a slightly positive pressure (0.12 MPa). 40 ml of refined n-heptane as a solvent, a certain amount of triisobutyl aluminium (TiBA, Al/Ti=250) as a cocatalyst, and a certain amount of bis-cyclopentyl dimethoxysilane (DCPMS/Ti=10) were successively added into the reactor. Another 40 ml n-heptane was added into the reactor, and the pressure of propylene was raised to 0.15 MPa. Then, the catalysts were added to start the polymerization, after the temperature in the reactor was maintained at 70° C. The instantaneous consumption of monomeric propylene was electronically collected (by the high-precision propylene mass flow meter connecting with a computer) during the reaction and recorded by the computer. After 1 h, the reaction was quenched with 50 ml mixed solution of hydrochloric acid/ethanol. The polymer was vacuum dried at 60° C. for 4 h, weighed and analyzed.

Example 48

100 mg of the catalyst in Example 21 was weighed for the polymerization. The polymerization reactor was first heated under vacuum and then replaced with highly pure nitrogen. This was repeated three times. A small amount of monomeric propylene was used to replace once. The reactor was filled with propylene to a slightly positive pressure (0.12 MPa). 40 ml of refined n-heptane as a solvent, a certain amount of triisobutyl aluminium (TiBA, Al/Ti=120) as a cocatalyst, and a certain amount of bis-cyclopentyl dimethoxysilane (DCPMS/Ti=10) were successively added into the reactor. Another 40 ml n-heptane was added into the reactor, and the pressure of propylene was raised to 0.15 MPa. Then, the catalysts were added to start the polymerization, after the temperature in the reactor was maintained at 70° C. The instantaneous consumption of monomeric propylene was electronically collected (by the high-precision propylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 49

100 mg of the catalyst in Example 22 was weighed for the polymerization. The polymerization reactor was first heated under vacuum and then replaced with highly pure nitrogen. This was repeated three times. A small amount of monomeric propylene was used to replace once. The reactor was filled with propylene to a slightly positive pressure (0.12 MPa). 40 ml of refined n-heptane as a solvent, a certain amount of triisobutyl aluminium (TiBA, Al/Ti=150) as a cocatalyst, and a certain amount of bis-cyclopentyl dimethoxysilane (DCPMS/Ti=10) were successively added into the reactor. Another 40 ml n-heptane was added into the reactor, and the pressure of propylene was raised to 0.15 MPa. Then, the catalysts were added to start the polymerization, after the temperature in the reactor was maintained at 70° C. The instantaneous consumption of monomeric propylene was electronically collected (by the high-precision propylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 50

100 mg of the catalyst in Example 2 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and 10 mL hydrogen were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 51

100 mg of the catalyst in Example 3 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and 10 mL of hydrogen were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 52

100 mg of the catalyst in Example 4 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and 10 mL of hydrogen were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 53

100 mg of a catalyst in Example 2 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and a certain amount of 1-hexene (0.8 mL, 2.4 mL, 4.0 mL, namely, 1 vol %, 3 vol %, 5 vol %) were successively added into the reactor (corresponded to Example 53-1, 53-2, 53-3, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 54

100 mg of the catalyst in Example 3 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and a certain amount of 1-hexene (0.8 mL, 2.4 mL, 4.0 mL, namely, 1 vol %, 3 vol %, 5 vol %) were successively added into the reactor (corresponded to Example 54-1, 54-2, 54-3, respectively). Another 40 ml n-heptane was added into the reactor, and the pressure of ethylene was raised to 0.15 MPa. Then, the catalysts were added to start the polymerization after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 55

100 mg of the catalyst in Example 4 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and a certain amount of 1-hexene (0.8 mL, 2.4 mL, 4.0 mL, namely, 1 vol %, 3 vol %, 5 vol %) were successively added into the reactor (corresponded to Example 55-1, 55-2, 55-3, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed and analyzed.

Example 56

100 mg of the catalyst in Example 23 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=5, 10, 15, 25) as a cocatalyst were successively added into the reactor (corresponded to Example 56-1, 56-2, 56-3, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 57

100 mg of the catalyst in Example 24 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=5, 10, 15, 25) as a cocatalyst were successively added into the reactor (corresponded to Example 57-1, 57-2, 57-3, respectively). Another 40 ml n-heptane was added into the reactor, and the pressure of ethylene was raised to 0.15 MPa. Then, the catalysts were added to start the polymerization after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 58

100 mg of the catalyst in Example 25 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=5, 10, 15, 25) as a cocatalyst were successively added into the reactor (corresponded to Example 58-1, 58-2, 58-3, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 59

100 mg of the catalyst in Example 26 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=10) as a cocatalyst were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 60

100 mg of the catalyst in Example 27 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=10) as a cocatalyst were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 61

100 mg of the catalyst in Example 23 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and 10 mL of hydrogen were successively added into the reactor. Another 40 ml n-heptane was added into the reactor, and the pressure of ethylene was raised to 0.15 MPa. Then, the catalysts were added to start the polymerization after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 62

100 mg of the catalyst in Example 24 was weighed for the polymerization. The polymerization reactor was first heated under vacuum and then replaced with highly pure nitrogen This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst and 10 mL of hydrogen were successively added into the reactor. Another 40 ml n-heptane was added into the reactor, and the pressure of ethylene was raised to 0.15 MPa. Then, the catalysts were added to start the polymerization after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 63

100 mg of the catalyst in Example 25 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and 10 mL of hydrogen were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 64

100 mg of the catalyst in Example 23 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and a certain amount of 1-hexene (0.8 mL, 2.4 mL, 4.0 mL, namely, 1 vol %, 3 vol %, 5 vol %) were successively added into the reactor (corresponded to Example 64-1, 64-2, 64-3, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 65

100 mg of the catalyst in Example 24 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and a certain amount of 1-hexene (0.8 mL, 2.4 mL, 4.0 mL, namely, 1 vol %, 3 vol %, 5 vol %) were successively added into the reactor (corresponded to Example 65-1, 65-2, 65-3, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Example 66

100 mg of a catalyst of Example 25 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and a certain amount of 1-hexene (0.8 mL, 2.4 mL, 4.0 mL, namely, 1 vol %, 3 vol %, 5 vol %) were successively added into the reactor (corresponded to Example 66-1, 66-2, 66-3, respectively). Another 40 ml n-heptane was added into the reactor, and the pressure of ethylene was raised to 0.15 MPa. Then, the catalysts were added to start the polymerization after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Comparison Example 1

10 g of silica gel (pore volume of 1.5-1.7 cm$^3$/g and surface area of 250-300 m$^2$/g) was impregnated with a solution of magnesium acetate (Mg loading was 5 wt %). After being continuously stirred for 5 h at room temperature, it was heated to 120° C. for drying 5 h and was dried at 120° C. for 6 h in drying oven. The silica gel support supporting magnesium acetate was calcined in a fluidized bed. Nitrogen was used before the temperature reached 300° C., then the atmosphere was changed to high purity air and kept at 600° C. for 4 h. The product was naturally cooled down to 400° C. under the protection of nitrogen gas. The high temperature calcining and cooling processes above are shown in FIG. 1. 2 g of the obtained product (catalyst matrix) reacted with 30 ml of TiCl$_4$ at 140° C. for 2 h, and was washed with n-hexane several times at room temperature. Finally, the product was dried under vacuum and the catalyst was obtained.

Comparison Example 2

10 g of silica gel (pore volume of 1.5-1.7 cm$^3$/g and surface area of 250-300 m$^2$/g) was impregnated with a solution of ammonium metavanadate (V loading was the amount of pure vanadium content at the molar ratio of magnesium and vanadium of 5:1). After being continuously stirred for 5 h at room temperature, it was heated to 120° C. for drying 5 h and was dried at 120° C. for 6 h in drying oven. The silica gel support supporting ammonium metavanadate was calcined in a fluidized bed. Nitrogen was used before the temperature reached 300° C., then the atmosphere was changed to high purity air and kept at 600° C. for 4 h. The product was naturally cooled down to 400° C. under the protection of nitrogen gas. The high temperature calcining and cooling processes above are shown in FIG. 1. 2 g of the obtained product (catalyst matrix) reacted with 30 ml of TiCl$_4$ at 140° C. for 2 h, and was washed with n-hexane several times at room temperature. Finally, the product was dried under vacuum and the catalyst was obtained.

Comparison Example 3

10 g of silica gel (pore volume of 1.5-1.7 cm$^3$/g and surface area of 250-300 m$^2$/g) was impregnated with a solution of chromic acetate (Cr loading was the amount of pure chromium content at the molar ratio of magnesium and chromium of 10:1). After being continuously stirred for 5 h at room temperature, it was heated to 120° C. for drying 5 h and was dried at 120° C. for 6 h in drying oven. The silica gel support supporting chromic acetate was calcined in a fluidized bed. Nitrogen was used before the temperature reached 300° C., then the atmosphere was changed to high purity air and kept at 600° C. for 4 h. The product was naturally cooled down to 400° C. under the protection of nitrogen gas. The high temperature calcining and cooling processes above are shown in FIG. 1. 2 g of obtained product (catalyst matrix) reacted with 30 ml of TiCl$_4$ at 140° C. for 2 h, and was washed with n-hexane several times at room temperature. Finally, the product was dried under vacuum and the catalyst was obtained.

Comparison Example 4

100 mg of the catalyst in Comparison Example 1 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=5, 10, 15, 20) as a cocatalyst were successively added into the reactor (corresponded to Comparison Example 4-1, 4-2, 4-3, 4-4, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) and recorded by the computer. After 1 h, the reaction was quenched with 50 ml of a mixed solution of hydrochloric acid/ethanol. The polymer was vacuum dried at 60° C. for 4 h, weighed, and analyzed.

Comparison Example 5

100 mg of the catalyst in Comparison Example 2 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=5, 10, 15, 20) as a cocatalyst were successively added into the reactor (corresponded to Comparison Example 5-1, 5-2, 5-3, 5-4, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Comparison Example 6

100 mg of the catalyst in Comparison Example 3 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent and a certain amount of triisobutyl aluminium (TiBA, Al/Ti=5, 10, 15, 20) as a cocatalyst were successively added into the reactor (corresponded to Comparison Example 6-1, 6-2, 6-3, 6-4, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed and analyzed.

Comparison Example 7

100 mg of the catalyst in Comparison Example 1 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and 10 mL of hydrogen were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Comparison Example 8

100 mg of the catalyst in Comparison Example 2 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and 10 mL of hydrogen were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Comparison Example 9

100 mg of the catalyst in Comparison Example 3 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and 10 mL of hydrogen were successively added into the reactor. Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Comparison Example 10

100 mg of the catalyst in Comparison Example 1 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and a certain amount of 1-hexene (0.8 mL, 2.4 mL, 4.0 mL, namely, 1 vol %, 3 vol %, 5 vol %) were successively added into the reactor (corresponded to Comparison Example 10-1, 10-2, 10-3, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Comparison Example 11

100 mg of the catalyst in Comparison Example 2 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and a certain amount of 1-hexene (0.8 mL, 2.4 mL, 4.0 mL, namely, 1 vol %, 3 vol %, 5 vol %) were successively added into the reactor (corresponded to Comparison Example 11-1, 11-2, 11-3, respectively). Another 40 ml n-heptane was added into the reactor, and the pressure of ethylene was raised to 0.15 MPa. Then, the catalysts were added to start the polymerization, after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Comparison Example 12

100 mg of the catalyst in Comparison Example 3 was weighed for the polymerization. The polymerization reactor was first heated under vacuum and then replaced with highly pure nitrogen. This was repeated three times. A small amount of monomeric ethylene was used to replace once. The reactor was filled with ethylene to a slightly positive pressure (0.12 MPa). 40 ml of refined n-heptane as a solvent, a certain amount of triisobutyl aluminium (TiBA, Al/Ti=10) as a cocatalyst, and a certain amount of 1-hexene (0.8 mL, 2.4 mL, 4.0 mL, namely, 1 vol %, 3 vol %, 5 vol %) were successively added into the reactor (corresponded to Comparison Example 12-1, 12-2, 12-3, respectively). Another 40 ml n-heptane was added into the reactor, and the pressure of ethylene was raised to 0.15 MPa. Then, the catalysts were added to start the polymerization after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 50 ml of a mixed solution of hydrochloric acid/ethanol. The polymer was vacuum dried at 60° C. for 4 h, weighed, and analyzed.

Comparison Example 13

50 mg of the catalyst in Example 3 was weighed for the polymerization. After the stainless steel reactor was cleaned with solvent, the catalyst was loaded, and the reactor was pumped with high purity nitrogen for 30 min under the condition of heating. The reactor was filled with ethylene to a slightly positive pressure (0.12 MPa). 200 ml of refined n-heptane as a solvent and a certain amount of triisobutyl aluminium (TiBA, Al/Ti=10) as a cocatalyst were successively added into the reactor. Then, the pressure of ethylene was raised to 0.3 MPa, and the catalysts were added to start the polymerization after the temperature in the reactor was maintained at 70° C. The instantaneous consumption of monomeric ethylene was electronically collected (by the high-precision ethylene mass flow meter connecting with a computer) during the reaction and recorded by the computer. After 1 h, the reaction was quenched with 100 ml of a mixed solution of hydrochloric acid/ethanol. The polymer was vacuum dried at 60° C. for 4 h, weighed, and analyzed.

The olefin polymerization activities of the above examples are shown in Table 1:

TABLE 1

| Examples | Polymerization activities of the examples Activity ($\times 10^4$ g Polymer/mol Ti · h) |
|---|---|
| Example 28 | 10.05 |
| Example 29-1 | 20.06 |
| Example 29-2 | 20.21 |
| Example 29-3 | 20.17 |
| Example 29-4 | 19.74 |
| Example 30-1 | 22.11 |
| Example 30-2 | 21.36 |
| Example 30-3 | 20.93 |
| Example 30-4 | 20.59 |
| Example 31-1 | 20.97 |
| Example 31-2 | 21.14 |
| Example 31-3 | 21.00 |
| Example 31-4 | 20.61 |
| Example 32 | 9.75 |
| Example 33 | 10.28 |
| Example 34 | 10.03 |
| Example 35 | 8.98 |
| Example 36 | 9.71 |
| Example 37 | 7.97 |
| Example 38 | 10.86 |
| Example 39 | 11.39 |
| Example 40 | 9.95 |
| Example 41 | 8.02 |
| Example 42 | 10.77 |
| Example 43 | 10.44 |
| Example 44 | 9.49 |
| Example 45 | 9.12 |
| Example 46 | 8.55 |
| Example 47 | 11.04 |
| Example 48 | 9.03 |
| Example 49 | 10.59 |
| Example 50 | 13.33 |
| Example 51 | 15.07 |
| Example 52 | 14.41 |
| Example 53-1 | 22.26 |
| Example 53-2 | 22.55 |
| Example 53-3 | 22.41 |
| Example 54-1 | 24.03 |
| Example 54-2 | 23.42 |
| Example 54-3 | 23.13 |
| Example 55-1 | 24.66 |
| Example 55-2 | 24.38 |
| Example 55-3 | 24.34 |
| Example 56-1 | 14.95 |
| Example 56-2 | 15.67 |
| Example 56-3 | 15.20 |
| Example 56-4 | 15.10 |
| Example 57-1 | 16.28 |
| Example 57-2 | 17.00 |
| Example 57-3 | 16.57 |
| Example 57-4 | 16.21 |
| Example 58-1 | 14.75 |
| Example 58-2 | 16.61 |
| Example 58-3 | 16.59 |
| Example 58-4 | 15.65 |
| Example 59 | 11.03 |
| Example 60 | 10.22 |
| Example 61 | 15.25 |
| Example 62 | 15.77 |
| Example 63 | 16.44 |
| Example 64-1 | 16.99 |
| Example 64-2 | 17.66 |
| Example 64-3 | 17.09 |
| Example 65-1 | 17.46 |
| Example 65-2 | 18.36 |
| Example 65-3 | 18.31 |

TABLE 1-continued

Polymerization activities of the examples

| Examples | Activity ($\times 10^4$ g Polymer/mol Ti · h) |
|---|---|
| Example 66-1 | 19.30 |
| Example 66-2 | 19.24 |
| Example 66-3 | 18.84 |
| Comparison Example 4-1 | 6.72 |
| Comparison Example 4-2 | 6.80 |
| Comparison Example 4-3 | 7.20 |
| Comparison Example 4-4 | 6.60 |
| Comparison Example 5-1 | 2.87 |
| Comparison Example 5-2 | 1.99 |
| Comparison Example 5-3 | 1.59 |
| Comparison Example 5-4 | 1.28 |
| Comparison Example 6-1 | 3.60 |
| Comparison Example 6-2 | 3.60 |
| Comparison Example 6-3 | 3.48 |
| Comparison Example 6-4 | 3.14 |
| Comparison Example 7 | 6.48 |
| Comparison Example 8 | 1.42 |
| Comparison Example 9 | 3.26 |
| Comparison Example 10-1 | 7.73 |
| Comparison Example 10-2 | 8.44 |
| Comparison Example 10-3 | 7.35 |
| Comparison Example 11-1 | 1.51 |
| Comparison Example 11-2 | 1.77 |
| Comparison Example 11-3 | 1.65 |
| Comparison Example 12-1 | 3.85 |
| Comparison Example 12-2 | 4.37 |
| Comparison Example 12-3 | 4.53 |
| Comparison Example 13 | 105.60 |

(1) The Effects of Cocatalyst

TABLE 2

Cocatalyst concentration effects on the ethylene hopolymerization with supported polymetal olefin polymerization catalysts

| Examples | Al/Ti | Activity ($\times 10^4$ g Polymer/mol Ti · h) | Melting Point (° C.) | Mw ($\times 10^5$) | MWD |
|---|---|---|---|---|---|
| Example 29-1 | 5 | 20.06 | 133 | 1.44 | 4.30 |
| Example 29-2 | 10 | 20.21 | 133 | 1.36 | 4.46 |
| Example 29-3 | 15 | 20.17 | 133 | 1.25 | 4.56 |
| Example 29-4 | 25 | 19.74 | 133 | 1.20 | 4.60 |
| Example 30-1 | 5 | 22.11 | 1334 | 1.42 | 5.19 |
| Example 30-2 | 10 | 21.36 | 134 | 1.28 | 4.82 |
| Example 30-3 | 15 | 20.93 | 134 | 1.17 | 4.03 |
| Example 30-4 | 25 | 20.59 | 134 | 1.16 | 5.26 |
| Example 31-1 | 5 | 20.97 | 133 | 1.38 | 3.92 |
| Example 31-2 | 10 | 21.14 | 134 | 1.27 | 3.49 |
| Example 31-3 | 15 | 21.00 | 134 | 1.16 | 4.37 |
| Example 31-4 | 25 | 20.61 | 134 | 1.08 | 3.72 |
| Example 56-1 | 5 | 14.95 | 134 | 1.16 | 4.34 |
| Example 56-2 | 10 | 15.67 | 134 | 1.05 | 4.55 |
| Example 56-3 | 15 | 15.20 | 134 | 1.04 | 4.84 |
| Example 56-4 | 25 | 15.10 | 134 | 1.01 | 4.69 |
| Example 57-1 | 5 | 16.28 | 134 | 1.20 | 2.71 |
| Example 57-2 | 10 | 17.00 | 134 | 1.05 | 3.41 |
| Example 57-3 | 15 | 16.57 | 134 | 1.04 | 3.85 |
| Example 57-4 | 25 | 16.21 | 134 | 0.98 | 3.42 |
| Example 58-1 | 5 | 14.75 | 133 | 1.40 | 4.36 |
| Example 58-2 | 10 | 16.61 | 134 | 1.22 | 3.77 |
| Example 58-3 | 15 | 16.59 | 134 | 1.07 | 3.80 |
| Example 58-4 | 25 | 15.65 | 134 | 1.05 | 3.33 |

Polymerization conditions: P = 0.15 MPa, h = 1 h, T = 70° C., n-heptane = 80 mL, cocatalyst TiBA Cocatalyst concentration effects on the ethylene homopolymerization with supported polymetal olefin polymerization catalysts investigated, as shown in Table 2. From Table 2, as for the catalyst prepared by Example 2, with the increase of cocatalyst concentration, namely Al/Ti from 5 to 25, the activity of the supported polymetal olefin polymerization catalysts increased to a maximum value then decreased when TiBA was used as cocatalyst, showing a similar tendency as other catalysts. This indicates that to achieve the maximum activity, the amount of cocatalyst has a proper value or range. When the amount of the cocatalyst is not enough, the activity of the catalyst will decrease because the active site can't be activated. When the amount of the cocatalyst is in excess, reduction action will result in the decline in the activity.

(2) The Effects of Another Metal or Several Kinds of Transition Metals on Ethylene Homopolymerization.

TABLE 3

The effects of another metal or several kinds of transition metals on ethylene homopolymerizationwith supportedpolymetal olefin polymerization catalysts

| Examples | Mg/Non-Mg (Molar Ratio) | Al/Ti | Activity ($\times 10^4$ g Polymer/mol Ti · h) | Melting Point (° C.) | Mw ($\times 10^6$) | MWD |
|---|---|---|---|---|---|---|
| Comparison Example4-1 | — | 5 | 6.72 | 133 | 1.53 | 5.06 |
| Comparison Example5-1 | — | 5 | 2.87 | 133 | 1.72 | 6.33 |
| Example29-1 | 1:1 | 5 | 20.06 | 133 | 1.44 | 4.30 |
| Example30-1 | 5:1 | 5 | 22.11 | 134 | 1.42 | 5.19 |
| Example31-1 | 10:1 | 5 | 20.97 | 133 | 1.38 | 3.92 |
| Comparison Example4-2 | — | 10 | 6.80 | 133 | 1.59 | 7.79 |
| Comparison Example6-2 | — | 10 | 3.60 | 133 | 1.38 | 4.31 |
| Example56-2 | 5:1 | 10 | 15.67 | 134 | 1.05 | 4.55 |
| Example57-2 | 10:1 | 10 | 17.00 | 134 | 1.05 | 3.41 |
| Example58-2 | 15:1 | 10 | 16.61 | 134 | 1.22 | 3.77 |

Polymerization conditions: P = 0.15 MPa, h = 1 h, T = 70° C., n-heptane = 80 mL, cocatalyst TiBA.

Table 3 shows the results of ethylene homopolymerization with the supported polymetal olefin polymerization catalyst with different contents of non-Mg metal. From Table 3, it could be seen that catalyst activity showed a substantial increase after the introduction of non-Mg metal. For the catalyst with vanadium metal, the catalytic activity achieved a maximum when the molar ratio of Mg/V was 5, and the activity was improved 2.3 times compared with the catalysts without vanadium metal under the same polymerization conditions. The activity of the chromium metal catalyst increased to a maximum value when the molar ratio of Mg/Cr was 10, and the activity was improved 1.5 times compared with the catalysts without chromium metal under the same polymerization conditions. Therefore, the catalytic activity can be effectively improved with the catalyst system with another non-magnesium metal component.

(3) 1-Hexene Amount Effects on Ethylene/1-Hexene Copolymerization

TABLE 4

1-Hexene effects on ethylene/1-hexene copolymerization with supported polymetal olefin polymerization catalysts

| Examples | 1-Hexene (mL) | Al/Ti | Activity ($\times 10^4$ g Polymer/mol Ti · h) | Melting Point (° C.) | Mw ($\times 10^6$) | MWD |
|---|---|---|---|---|---|---|
| Example 29-2 | 0 | 10 | 20.21 | 133 | 1.36 | 4.46 |
| Example 53-1 | 0.8 | 10 | 22.26 | 124 | 0.90 | 4.58 |
| Example 53-2 | 2.4 | 10 | 22.55 | 122 | 0.68 | 4.80 |
| Example 53-3 | 4.0 | 10 | 22.41 | 121 | 0.53 | 5.43 |
| Example 30-2 | 0 | 10 | 21.36 | 134 | 1.28 | 4.82 |

TABLE 4-continued

1-Hexene effects on ethylene/1-hexene copolymerization with supported polymetal olefin polymerization catalysts

| Examples | 1-Hexene (mL) | Al/Ti | Activity (×10$^4$ g Polymer/mol Ti · h) | Melting Point (° C.) | Mw (×10$^6$) | MWD |
|---|---|---|---|---|---|---|
| Example 54-1 | 0.8 | 10 | 24.03 | 126 | 0.67 | 4.44 |
| Example 54-2 | 2.4 | 10 | 23.42 | 123 | 0.51 | 4.36 |
| Example 54-3 | 4.0 | 10 | 23.13 | 122 | 0.39 | 4.52 |
| Example 31-2 | 0 | 10 | 21.14 | 134 | 1.27 | 3.49 |
| Example 55-1 | 0.8 | 10 | 24.66 | 124 | 0.52 | 3.46 |
| Example 55-2 | 2.4 | 10 | 24.38 | 122 | 0.50 | 3.20 |
| Example 55-3 | 4.0 | 10 | 24.34 | 121 | 0.38 | 5.98 |
| Example 56-2 | 0 | 10 | 15.67 | 134 | 1.05 | 4.55 |
| Example 64-1 | 0.8 | 10 | 16.99 | 125 | 0.60 | 6.08 |
| Example 64-2 | 2.4 | 10 | 17.66 | 124 | 0.32 | 6.12 |
| Example 64-3 | 4.0 | 10 | 17.09 | 123 | 0.30 | 5.53 |
| Example 57-2 | 0 | 10 | 17.00 | 134 | 1.05 | 3.41 |
| Example 65-1 | 0.8 | 10 | 17.46 | 126 | 0.60 | 3.99 |
| Example 65-2 | 2.4 | 10 | 18.36 | 123 | 0.48 | 7.99 |
| Example 65-3 | 4.0 | 10 | 18.31 | 123 | 0.42 | 7.66 |
| Example 58-2 | 0 | 10 | 16.61 | 134 | 1.22 | 3.77 |
| Example 66-1 | 0.8 | 10 | 19.30 | 124 | 0.69 | 3.81 |
| Example 66-2 | 2.4 | 10 | 19.24 | 123 | 0.50 | 4.36 |
| Example 66-3 | 4.0 | 10 | 18.84 | 122 | 0.48 | 4.52 |
| Comparision Example 4-3 | 0 | 15 | 7.20 | 133 | 1.45 | 4.57 |
| Comparision Example 10-1 | 0.8 | 15 | 7.73 | 125 | 0.80 | 8.53 |
| Comparision Example 10-2 | 2.4 | 15 | 8.44 | 123 | 0.78 | 7.12 |
| Comparision Example 10-3 | 4.0 | 15 | 7.35 | 122 | 0.71 | 7.01 |
| Comparision Example 5-2 | 0 | 10 | 1.99 | 133 | 1.71 | 6.55 |
| Comparision Example 11-1 | 0.8 | 10 | 1.51 | 131 | 1.57 | 6.35 |
| Comparision Example 11-2 | 2.4 | 10 | 1.77 | 130 | 1.52 | 5.26 |
| Comparision Example 11-3 | 4.0 | 10 | 1.65 | 130 | 1.49 | 5.4 |
| Comparision Example 6-2 | 0 | 10 | 3.60 | 133 | 1.38 | 4.31 |
| Comparision Example 12-1 | 0.8 | 10 | 3.85 | 128 | 0.97 | 5.27 |
| Comparision Example 12-2 | 2.4 | 10 | 4.37 | 126 | 0.77 | 7.71 |
| Comparision Example 12-3 | 4.0 | 10 | 4.53 | 125 | 0.74 | 6.6 |

Polymerization conditions: P = 0.15 MPa, h = 1 h, T = 70° C., n-heptane = 80 mL, cocatalyst TiBA.

Ethylene/1-hexene copolymerization results with different supported polymetal olefin polymerization catalysts are listed in Table 4. The activities of ethylene/1-hexene copolymerization with all the catalysts showed an increasing tendency with respect to the ethylene homopolymerization. The activities of the supported polymetal olefin polymerization catalysts were much higher than that of the catalyst without the non-magnesium metal component. However, the polymerization activity first increased then decreased with the increase of 1-hexene concentrations, and the Mw of polymers was significantly decreased with the introduction of 1-hexene.

(4) The Effects of Catalysts with Non-Mg Metal Component on 1-Hexene Incorporation

TABLE 5

The effects of catalysts with non-Mg metal component on 1-hexene incorporation

| Example | Mg/non-Mg (Molar Ratio) | Al/Ti | 1-Hexene Incorporation (mol %) |
|---|---|---|---|
| Example 54-3 | Mg/V = 5:1 | 10 | 19.07 |
| Example 65-3 | Mg/Cr = 15:1 | 10 | 16.30 |
| Comparision Example 10-3 | — | 15 | 9.42 |

Polymerization conditions: P = 0.15 MPa, h = 1 h, T = 70° C., n-heptane = 80 mL, cocatalyst TiBA.

Table 5 shows the effects of the catalysts with another or several transition metals on 1-hexene incorporation. From Table 5, it could be seen that the 1-hexene incorporation during ethylene/1-hexene copolymerization was significantly improved with the catalysts with non-Mg metal component, with respect to the catalysts without non-Mg metal component. 1-hexene incorporations were increased by 102% and 73% for the catalysts with vanadium and chromium component, respectively.

(5) Hydrogen Effects on the Polymerization

TABLE 6

Hydrogen effects on the polymerization

| Example | H$_2$ (mL) | Activity (×10$^4$ g Polymer/ mol Ti · h) | Melting Point (° C.) | Mw (×10$^6$) | MWD |
|---|---|---|---|---|---|
| Example 29-2 | 0 | 20.21 | 133 | 1.36 | 4.46 |
| Example 50 | 10 | 13.33 | 134 | 0.65 | 4.92 |
| Example 30-2 | 0 | 21.36 | 134 | 1.28 | 4.82 |
| Example 51 | 10 | 15.07 | 134 | 0.58 | 3.35 |
| Example 31-2 | 0 | 21.14 | 134 | 1.27 | 3.49 |
| Example 52 | 10 | 14.41 | 135 | 0.69 | 3.43 |
| Example 56-2 | 0 | 15.67 | 134 | 1.05 | 4.55 |
| Example 61 | 10 | 15.25 | 134 | 0.60 | 4.61 |
| Example 57-2 | 0 | 17.00 | 134 | 1.05 | 3.41 |
| Example 62 | 10 | 15.77 | 134 | 0.57 | 2.99 |
| Example 58-2 | 0 | 16.61 | 134 | 1.22 | 3.77 |
| Example 63 | 10 | 16.44 | 134 | 0.62 | 2.60 |
| Comparision Example 4-2 | 0 | 6.80 | 133 | 1.59 | 7.79 |
| Comparision Example 7 | 10 | 6.48 | 134 | 1.03 | 6.80 |
| Comparision Example 5-2 | 0 | 1.99 | 133 | 1.71 | 6.55 |
| Comparision Example 8 | 10 | 1.42 | 134 | 1.03 | 6.4 |
| Comparision Example 6-2 | 0 | 3.60 | 133 | 1.38 | 4.31 |
| Comparision Example 9 | 10 | 3.26 | 134 | 0.7 | 5.35 |

Polymerization conditions: P = 0.15 MPa, h = 1 h, T = 70° C., n-heptane = 80 mL, cocatalyst TiBA, Al/Ti = 10.

From Table 6, it could be seen that the polymerization activity in the presence of hydrogen was lower that in the absence of hydrogen. Mw was also reduced, indicating that hydrogen is a good chain transfer agent leading to the decrease of Mw. After analysis of the hydrogen sensitivity of each catalyst, it was found that with the addition of equal amounts of hydrogen into the reaction system, the Mw of polymers obtained from the catalysts with vanadium or chromium metal component was more significantly reduced. In other words, the catalysts with vanadium or chromium metal component were more sensitive to hydrogen, especially the catalyst with vanadium metal component.

As described above, only preferred embodiments of the present invention are presented and are not intended to limit the scope of the present invention. The embodiments described above of the present invention may be variously modified. That is, all the simple, equivalent changes and modifications of claims, and the descriptions in accordance with the present invention are within the scope of the claims protection of the present invention. The technical contents not described in detail in the present invention are conventional.

What is claimed is:

1. A supported polymetal olefin polymerization catalyst, comprising: a porous support; a magnesium-containing support component; a transition metal titanium component supported on the porous support; and further comprising at least one non-magnesium metal component supported on the porous support, wherein the non-magnesium metal component comprises a metal other than magnesium selected from the group consisting of vanadium, chromium, titanium, ferrum, cobalt, nickel, copper, zinc, molybdenum, wolframium, zirconium, aluminum, lithium, sodium, potassium, calcium, and combinations thereof, and wherein the general formula of the non-magnesium metal component is $M_dO_f(L^2)_e$, wherein M is the non-magnesium metal, $L^2$ is a $C_1$-$C_{20}$ alkyl group $R^2$ or alkoxy group $R^2O$, wherein $R^2$ is a saturated or unsaturated straight-chain, branched or cyclic chain (including aromatic hydrocarbons), $1 \leq d \leq 2$, $0 \leq f \leq 5$, $0 \leq e \leq 5$, and wherein when e is 2 or more than 2, each $R^2$ may be the same or different.

2. The supported polymetal olefin polymerization catalyst according to claim 1, wherein said magnesium-containing support component is a magnesium compound and is one or more of the general formula $MgO_v(L^1)_jCl_m$ and combinations thereof, wherein $L^1$ is a $C_1$-$C_{20}$ alkyl group $R^1$ or alkoxy group $R^1O$, wherein $R^1$ is a saturated or unsaturated straight-chain, branched or cyclic chain (including aromatic hydrocarbons), $0 \leq v \leq 1$, $0 \leq m \leq 2$, $0 \leq j \leq 2$, and wherein when j is 2, $L^1$ may be the same or different.

3. The supported polymetal olefin polymerization catalyst according to claim 1, wherein the transition metal titanium component is a titanium-containing compound having the general formula $Ti(L^3)_nCl_{4-n}$, or $Ti(L^3)_gCl_{3-g}$, wherein $L^3$ is a $C_1$-$C_{20}$ alkyl group $R^3$ or alkoxy group $R^3O$, wherein $R^3$ is a saturated or unsaturated straight-chain, branched or cyclic chain (including aromatic hydrocarbons), $1 \leq n \leq 4$, $0 \leq g \leq 3$, and wherein when n or g is 2 or more than 2, each $R^3$ may be same or different.

4. The supported polymetal olefin polymerization catalyst according to claim 1, wherein the weight of magnesium of the magnesium-containing support component is 0.5 wt % to 20 wt % based on the total weight of the catalyst.

5. The supported polymetal olefin polymerization catalyst according to claim 1, wherein the molar ratio of the transition metal titanium component to the magnesium-containing support component is 0.01:1 to 10:1.

6. The supported polymetal olefin polymerization catalyst according to claim 1, wherein the molar ratio of the magnesium-containing support component to the non-magnesium metal component is 0.1:1 to 30:1.

7. A preparation method of the supported polymetal olefin polymerization catalyst according to claim 1 comprising: a step S1, wherein the porous support (carrier) is impregnated with a mixed solution of a soluble magnesium compound and non-magnesium metal compound, followed by calcination at high temperature of 300~900° C.; and a step S2, wherein the product obtained from step S1 further reacts with the transition metal titanium component or solution thereof to obtain the catalyst.

8. The preparation method of the supported polymetal olefin polymerization catalyst according to claim 7 wherein step S1 further comprises modifying the surface of the calcined product after calcination reaction at high temperature using one or two of an organic magnesium compound and an organic aluminum compound to remove the surface residual hydroxyl group, wherein the general formula of the organic magnesium compound is $R^5_pMgX_{2-p}$, wherein $R^5$ is a $C_1$-$C_{20}$ alkyl group, $R^5$ is a saturated or unsaturated straight-chain, branched or cyclic chain (including aromatic hydrocarbons), $0 \leq p \leq 2$, wherein when p=2, $R^5$ may be same or different, and wherein X is one or more halogens selected from the group consisting of fluorine, chlorine, bromine and iodine.

9. The preparation method of the supported polymetal olefin polymerization catalyst according to claim 7 wherein the soluble magnesium compound is magnesium nitrate, magnesium acetate, magnesium bicarbonate, magnesium chromate, magnesium fluoride, magnesium sulfate, magnesium chlorate or magnesium phosphate.

10. A method of preparing a supported polymetal olefin polymerization catalyst comprising: a porous support; a magnesium-containing support component; a transition metal titanium component supported on the porous support; and further comprising at least one non-magnesium metal component supported on the porous support, the method comprising: a step S1, wherein the porous support (carrier) is impregnated with a mixed solution of a soluble magnesium compound and non-magnesium metal compound, followed by calcination at high temperature of 300~900° C.; and a step S2, wherein the product obtained from step S1 further reacts with the transition metal titanium component or solution thereof to obtain the catalyst, wherein the soluble non-magnesium metal compound is selected from:

one or more than one soluble vanadium compounds of ammonium hexafluorovanadate, vanadium nitrate, vanadium oxyoxalate, ammonium metavanadate, vanadyl sulfate, vanadium(IV) sulfate oxide hydrate, vanadyl(III)sulfate, vanadium trichloride, sodium orthovanadate, sodium metavanadate, vanadylacetonate vanadium oxide, isopropyl orthovanadate, vanadyl-tris-n-propoxide, vanadyl acetylacetonate, vanadium oxytriethoxide, vanadyl chloride, and vanadium silicide;

one or more than one soluble chromium compounds of chromic nitrate, chromium chloride, chromic sulfate, diammonium chromate, ammonium bichromate, and chromic acetate;

one or more than one soluble molybdenum compounds of molybdenum phosphate, molybdenum acetate, molybdenum sulfate, silicomolybdic acid, ammonium molybdate, and molybdenum nitride;

one or more than one soluble wolframium compounds of wolframium nitrate, phosphotungstic acid, wolframium sulfate, wolframium carbonate, and wolframium acetate one or more than one soluble aluminum compounds of aluminum nitrate, aluminum sulfate, aluminum oxalate and aluminum borate;

one or more than one soluble zirconium compounds of zirconium nitrate, zirconium carbonate, zirconium oxysulfate and basic zirconium sulfate;

one or more than one soluble zinc compounds of zinc nitrate, zinc oxalate, zinc thiolacetic, zinc acetate and zinc carbonate hydroxide;

one or more than one soluble copper compounds of copper sulfate, copper carbonate, cupric nitrate and copper phosphate;

one or more than one soluble ferric compounds of ferric acetate, ferric nitrate, ferric oxalate, and ferric gluconate; and one or more than one soluble nickel compounds of nickel nitrate, nickel sulfate, nickel carbonate and chromic acetate.

11. The preparation method of the supported polymetal olefin polymerization catalyst according to claim 7, wherein the titanium-containing component is one or more of the general formula $Ti(L^4)_hCl_{4-h}$ or $Ti(L^4)_sCl_{3-s}$ or $Ti(L^4)_tCl_{2-t}$, wherein, $L^4$ is a $C_1$-$C_{20}$ alkyl group $R^4$ or alkyl oxide group $R^4O$, wherein $R^4$ is a saturated or unsaturated straight-chain, branched or cyclic chain (including aromatic hydrocarbons), $0 \leq h \leq 4$, $0 \leq s \leq 3$, $0 \leq t \leq 2$, and wherein when h or s is 2 or more than 2 or t is 2, $R^4$ may be the same or different.

12. A method of using a supported polymetal olefin polymerization catalyst according to claim 1, comprising contacting the supported polymetal olefin polymerization catalyst with one or more reactants selected from the group consisting of ethylene, propylene, butene, hexene and octene, whereby the one or more reactants are polymerized or copolymerized.

* * * * *